United States Patent [19]

Arai et al.

[11] Patent Number: 5,128,769
[45] Date of Patent: Jul. 7, 1992

[54] METHOD AND APPARATUS FOR CONTROLLING EXPOSURE OF VIDEO CAMERA

[75] Inventors: Fumihito Arai; Yoshihiko Mori, both of Tokyo, Japan

[73] Assignee: Fuji Photo Film Co., Ltd., Kanagawa, Japan

[21] Appl. No.: 553,616

[22] Filed: Jul. 18, 1990

[30] Foreign Application Priority Data

| Jul. 18, 1989 | [JP] | Japan | 1-184951 |
| Jul. 18, 1989 | [JP] | Japan | 1-184952 |
| Jul. 18, 1989 | [JP] | Japan | 1-184953 |
| Jul. 31, 1989 | [JP] | Japan | 1-198868 |
| Aug. 2, 1989 | [JP] | Japan | 1-200734 |
| Aug. 4, 1989 | [JP] | Japan | 1-203580 |
| Sep. 4, 1989 | [JP] | Japan | 1-228588 |
| Sep. 4, 1989 | [JP] | Japan | 1-228589 |

[51] Int. Cl.$^5$ .......................................... H04N 5/238
[52] U.S. Cl. .......................... 358/228; 358/209; 358/213.19
[58] Field of Search ............... 358/228, 227, 209, 225, 358/213.19, 909; 354/446; 352/141

[56] References Cited

U.S. PATENT DOCUMENTS

| 4,473,843 | 9/1984 | Bishop | 358/228 |
| 4,516,172 | 5/1985 | Miyata | 358/228 |
| 4,584,610 | 4/1986 | Mizokami | 358/228 |
| 4,639,767 | 9/1987 | Suzuki | 358/21 R |
| 4,641,180 | 2/1987 | Richter | 358/31 |
| 4,651,206 | 3/1987 | Ohki | 358/136 |
| 4,651,226 | 3/1987 | Motoori | 358/228 |
| 4,739,390 | 4/1988 | Achiha | 358/11 |
| 4,745,458 | 5/1988 | Hirano | 358/11 |
| 4,754,322 | 6/1966 | Okuda | 358/31 |
| 4,754,333 | 6/1988 | Nara | 358/909 |
| 4,853,775 | 8/1989 | Rouvrais | 358/105 |
| 4,864,409 | 9/1989 | Platte | 358/222 |
| 4,868,650 | 9/1989 | Weckenbrock | 358/105 |
| 4,891,699 | 1/1990 | Hamada | 358/136 |
| 4,901,145 | 2/1990 | Harradine | 358/105 |
| 4,924,317 | 5/1990 | Hirao | 358/227 |
| 4,959,728 | 9/1990 | Takahashi | 358/228 |
| 4,969,045 | 11/1990 | Haruki | 358/228 |
| 4,998,162 | 3/1991 | Kondo | 358/228 |
| 5,003,399 | 3/1991 | Ishimaru | 358/209 |

Primary Examiner—James J. Groody
Assistant Examiner—Sherrie Hsia

[57] ABSTRACT

An exposure control apparatus receives a video signal from a scene pick-up image sensor and performs a divided brightness measuring for an image free. In accordance with the brightness distribution or a change amount of a scene obtained by the divided brightness measuring, the adjustment speed for a diaphragm is switched. In another embodiment, a scene brightness value for use as the exposure control is corrected to thereby obtain a smooth exposure control for continuous scenes. Scene pick-up by panning is detected by a built-in acceleration sensor in a video camera. Therefore, if the video camera is moved abruptly, then the exposure control is made slowly.

15 Claims, 31 Drawing Sheets

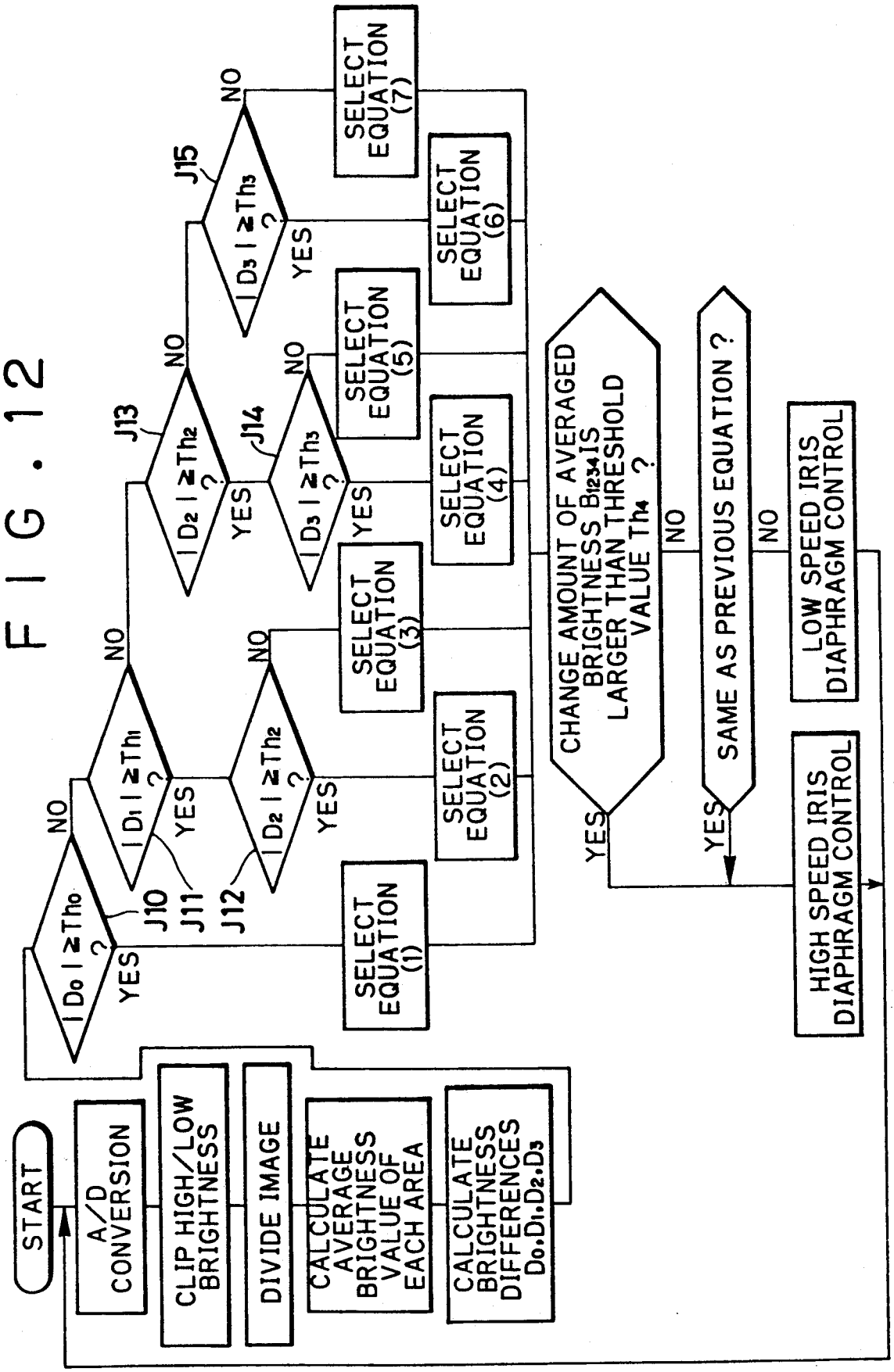

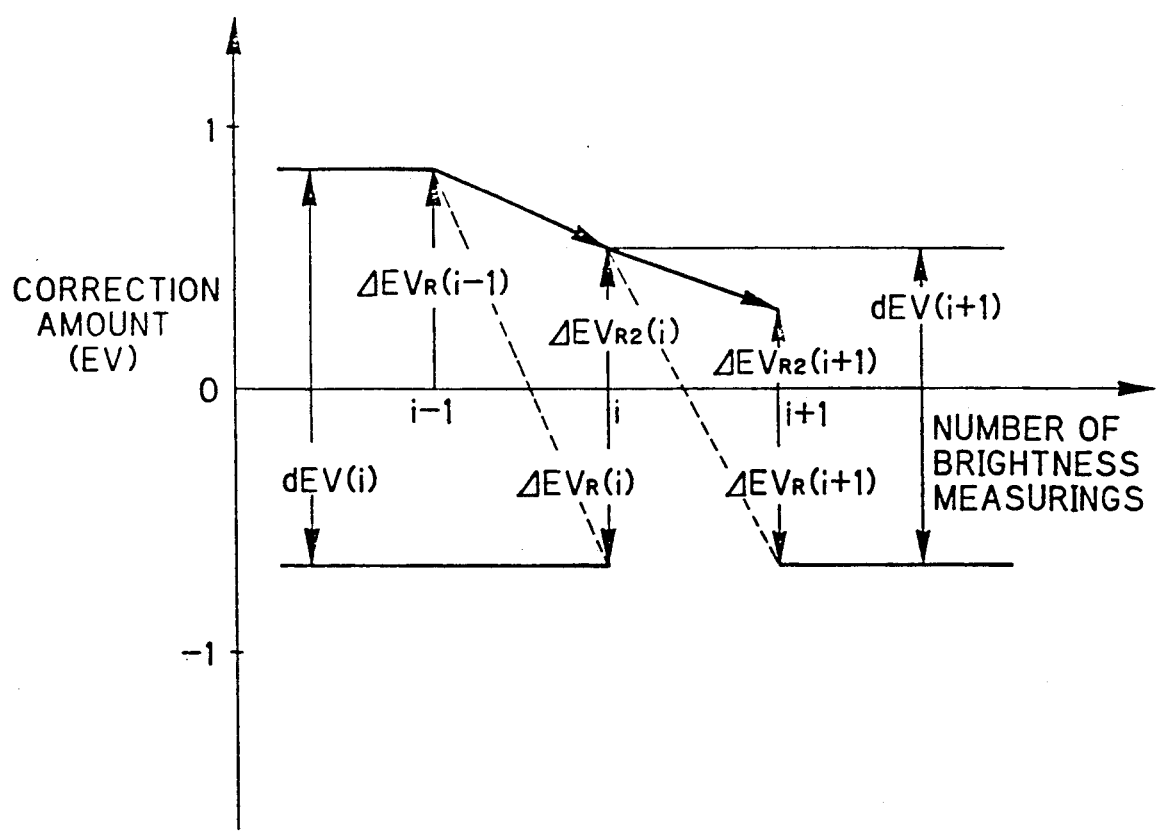
F I G . 31

METHOD AND APPARATUS FOR CONTROLLING EXPOSURE OF VIDEO CAMERA

BACKGROUND OF THE INVENTION

The present invention relates to a method and an apparatus for controlling the exposure of video cameras. More particularly, the invention relates to a method and an apparatus for controlling an exposure amount in accordance with a video signal from an image sensor.

A conventional video camera includes a built-in exposure control apparatus which automatically regulates the intensity of light incident to an image sensor of CCD or MOS type FETs in accordance with the brightness of a scene For instance, in an apparatus for automatically adjusting an exposure amount by using a diaphragm (an iris diaphragm), the diaphragm is adjusted to an aperture size suitable for a proper exposure amount in accordance with the scene brightness value detected through averaged brightness measuring, spot brightness measuring, or multi-pattern measuring. Instead of the exposure being controlled by a diaphragm, it is also known to control a charge accumulation time of an image sensor in accordance with a scene brightness value When a video camera or a still video camera is in a continuous pick-up mode having such an exposure control apparatus, the diaphragm aperture size or the charge accumulation time may be controlled so as to quickly follow a change in a scene brightness value Thereby, the exposure control quickly responds to the start of picking up a scene or the change of a scene Even for the case when the same principal subject is continuously picked up, the brightness distribution of a scene may change more or less. For instance, the brightness distribution of a scene changes greatly during panning while a moving principal subject is picked up. In such a case where the conventional exposure control apparatus has a quick response performance, the diaphragm aperture size or the image sensor charge accumulation time frequently changes, and an unnatural exposure control results. For instance, in the case of the averaged brightness measuring, although the brightness of a principal subject changes very little, the background brightness changes considerably and the exposure control is executed correspondingly. As a result, the exposure amount of the principal subject changes frequently so that the image brightness of the reproduced principal subject changes too often and is very awkward.

Such problems are particularly conspicuous for the case of spot brightness measuring and multi-pattern measuring. For instance, if an image of a principal subject moves away from the spot photometric area at the center of a scene because of tracking with delay for the principal subject during panning, or if an abnormal light is incident to the photometric area, the exposure control apparatus responds to the conditions and corrects the exposure. Thereby, in a change of the principal subject irrespective of a continuous scene thereof, an unnatural exposure control results.

There is also known an exposure control method by which a frame is divided into a central area and a peripheral area and either the center weighted measuring mode or the averaged measuring mode is automatically selected to obtain an optimum exposure of, e.g., a rear light scene. With such a two mode switching method and multi-pattern measuring method, the center weighted measuring is selected if the center of a scene is far brighter than the peripheral areas. Such a scene has a proper exposure for a principal subject if the subject is located at the center of the frame, but the scene becomes under-exposed if the subject is located at the peripheral area.

OBJECTS OF THE INVENTION

It is therefore an object of the present invention to provide a method and an apparatus for controlling an exposure of a video camera so as to suppress an unstable change in the exposure amount for a principal subject caused by a motion of the principal subject or the video camera.

It is another object of the present invention to provide a method and apparatus for controlling an exposure of a video camera without a significant failure of the exposure control.

SUMMARY OF THE INVENTION

In order to achieve the above and other objects and advantages of this invention, the speed of the exposure control and the exposure amount are determined by taking into account the degree of the scene change so that the exposure amount can be smoothly changed. Such exposure control is conducted by adjusting the diaphragm or the image sensor charge accumulation time.

According to a preferred first embodiment of this invention, a scene change is estimated from a change in brightness values of two areas in the scene, and by considering the scene estimation. Thereby, a high or low speed exposure control may be selected.

In a second embodiment of this invention, an acceleration sensor is mounted on a video camera. As a result, a high or a low speed exposure control may be selected in accordance with the motion speed of the video camera detected by the acceleration sensor.

A third embodiment of the present invention selects the exposure control speed in accordance with the degree of change in the brightness value obtained through the multi-pattern measuring.

A fourth embodiment of this invention executes the multi-pattern measuring periodically for determining an equation most frequently selected during a predetermined period. This determined equation is used for obtaining a multi-pattern measured brightness value and executing the exposure control until a next equation is determined.

In a fifth embodiment of the present invention, the multi-pattern measuring is executed periodically to obtain a plurality of multi-pattern measured brightness values by using an equation which matches the brightness distribution of a scene. Also, the exposure control is executed by using an average value of multi-pattern measured brightness values obtained during a predetermined time period.

A sixth embodiment of the present invention is directed to correcting the multi-pattern measured brightness value in order to set a proper exposure amount of a principal subject when abnormal light is present at the center of a frame.

In a seventh embodiment of this invention, if a threshold value is smaller than the difference between the overall image averaged brightness value for substantially the overall area of a frame and the multi-pattern measured brightness value, then the overall image averaged brightness value is corrected by an amount within a predetermined value range. Thereby, the exposure control is executed by using the corrected overall image averaged brightness value.

In an eighth embodiment of this invention, the correction amount is determined by taking into account the previous correction amount. If the averaged brightness value does not change extraordinarily, the exposure amount is changed stepwise.

A ninth embodiment of the present invention determines a scene brightness value by weighting the averaged brightness value of each area of a frame. The weighting value is determined by considering the previous weighting value so that a smooth exposure control results.

BRIEF DESCRIPTION OF THE DRAWINGS

The above objects and advantages of the present invention will become more apparent from the following detailed description when read in connection with the accompanying drawings in which:

FIG. 12 is a flow chart for explaining the operation of the embodiment illustrated in FIG. 11;

FIG. 31 is a time chart illustrating an example of calculating the correction amount $\Delta EV_{R2}(i)$ illustrated in FIG. 29;

DETAILED DESCRIPTION OF THE PREFERRED EMBODIMENTS OF THE PRESENT INVENTION

Figure 1:
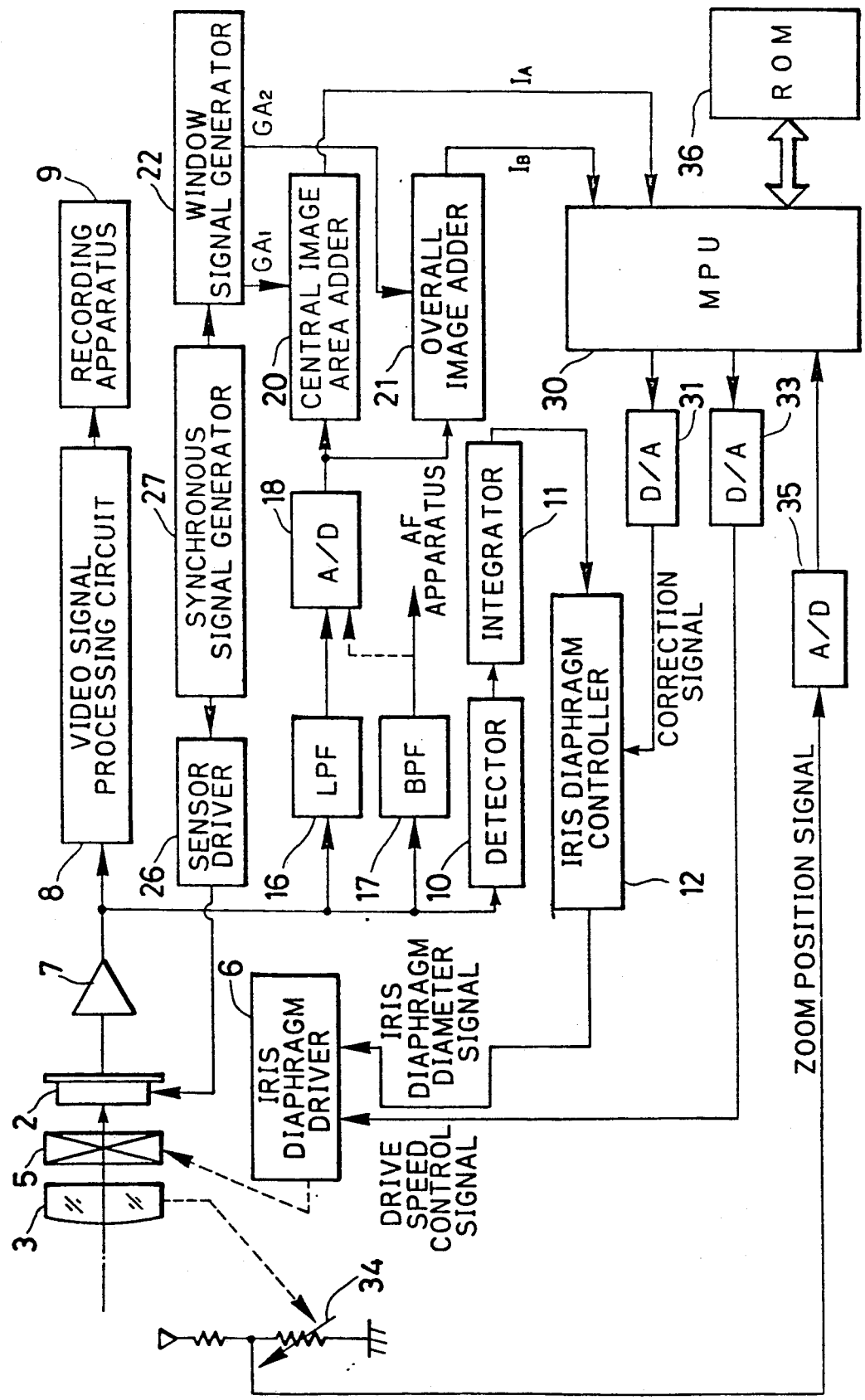
FIG. 1 is a block diagram illustrating an embodiment of the present invention wherein changes in the brightness values of two areas in a scene are detected for accordingly selecting the diaphragm control speed in two steps.

Referring now to FIG. 1 which illustrates the outline of the electronic circuit arrangement of a video camera, an image of a scene is formed at the image pickup surface of an image sensor 2 of CCD or MOS type by a taking lens 3. Between the taking lens 3 and the image sensor 2, an iris diaphragm 5 is mounted which has a diaphragm driver 6 for changing the aperture size of the diaphragm 5 to thereby adjust the exposure amount for the image sensor 2.

A pre-amplifier 7 is connected to the image sensor 2 for amplifying a video signal outputted from the image sensor 2. The video signal outputted from the pre-amplifier 7 is inputted to a video signal processing circuit 8 and subjected to signal processing operation such as gamma correction and signal conversion conforming with the NTSC system. The processed video signal is then sent to a recording apparatus 9. The recording apparatus 9 is a known conventional magnetic recording apparatus which records the processed video signal on a recording apparatus which records the processed video signal on a recording medium such as a magnetic tape.

A detector 10 connected to the pre-amplifier 7 derives three color signals from the video signal and supplies the three color signals to an integrator 11. The integrator 11 integrates the three color signals to obtain an overall exposure amount of the image sensor 2, and outputs the overall exposure amount to a diaphragm controller 12. The diaphragm controller 12 outputs a diaphragm aperture size signal such that the integrated overall exposure amount becomes a predetermined constant value, i.e., a reference value that is determined in accordance with the dynamic range of the image sensor 2. This diaphragm aperture size signal is inputted to the diaphragm driver 6 for effecting a feedback control of the diaphragm 5 so that the overall exposure amount for the image sensor 2 becomes a constant value.

The video signal from the pre-amplifier 7 is supplied to a low-pass filter 16 for photometry and a band-pass filter 17 for range finding. The low-pass filter 16 has a cutoff frequency at about 1.8 MHz for picking up the brightness signal components from the video signal and supplying the components to an A/D converter 18. The band-pass filter 17 has a pass-band from 60 KHz to 2.4 MHz, which is the spatial frequency components of a usual subject, for picking up the signal components within the pass-band from the video signal, and sending the components to an auto-focus apparatus (AF apparatus). This AF apparatus checks the contrast of an image in accordance with the spatial frequency, and adjusts the focus of the taking lens 3 so that a maximum contrast results.

The A/D converter 18 converts the brightness signal derived by the low-pass filter 16 into a digital signal and outputs the digital signal to a central image area adder 20 and an overall image adder 21 which has gate signals $GA_1$ and $GA_2$ applied thereto from a window signal generator 22. As indicated by the dotted line in FIG. 2, the gate signal $GA_2$ causes the overall image adder 21 to add brightness signals at pixels only within an area 23B having an exception in the upper area of the frame 23 where a bright sky is located. The window signal generator 22, as well as a sensor driver 26 for driving the image sensor 2, operate in synchronism with clock pulses from a synchronous signal generator 27.

The central image area adder 20 and overall image adder 21 add brightness signals for the central area 23A and overall area 23B, respectively, for obtaining a central image area averaged brightness value $I_A$ and an overall image averaged brightness value $I_B$ which are sent to a microprocessor unit (MPU) 30. The central image area averaged brightness value $I_A$ and the overall image averaged brightness value $I_B$ are the average brightness values obtained by brightness values $\Sigma_A$ and $\Sigma_B$ respectively for the central area 23A and the overall frame 23B divided by the corresponding areas $S_A$ and $S_B$, which are given by:

$$I_A = \Sigma_A / S_A, \text{ and } I_B = \Sigma_B / S_B.$$

The MPU 30 calculates a logarithm of a ratio of the central area averaged brightness value $I_A$ to the overall image averaged brightness value $I_B$, which is given by:

$$D = \log(I_A / I_B).$$

If the absolute value $|D|$ is in excess of a threshold value $Th_D$, the center weighted measuring (the exposure control mode which emphasizes the central area 23A) is selected to output a correction signal for correcting the reference value. This correction signal is supplied via a D/A converter 31 to the diaphragm controller 12. The gain of the diaphragm controller 12 is regulated by the correction signal for controlling the exposure. If $|D| \leq Th_D$, the averaged brightness measuring is selected so that the correction signal is not output. In this manner, if the brightness distribution within the frame 23 corresponds to a rear light or a spot illumination state, the exposure control is conducted to obtain a proper exposure at the central area 23A. If the brightness distribution corresponds to an ordinary state such as a front light state, the exposure control is conducted to obtain a proper exposure for the overall area of frame 23.

Figure 3:
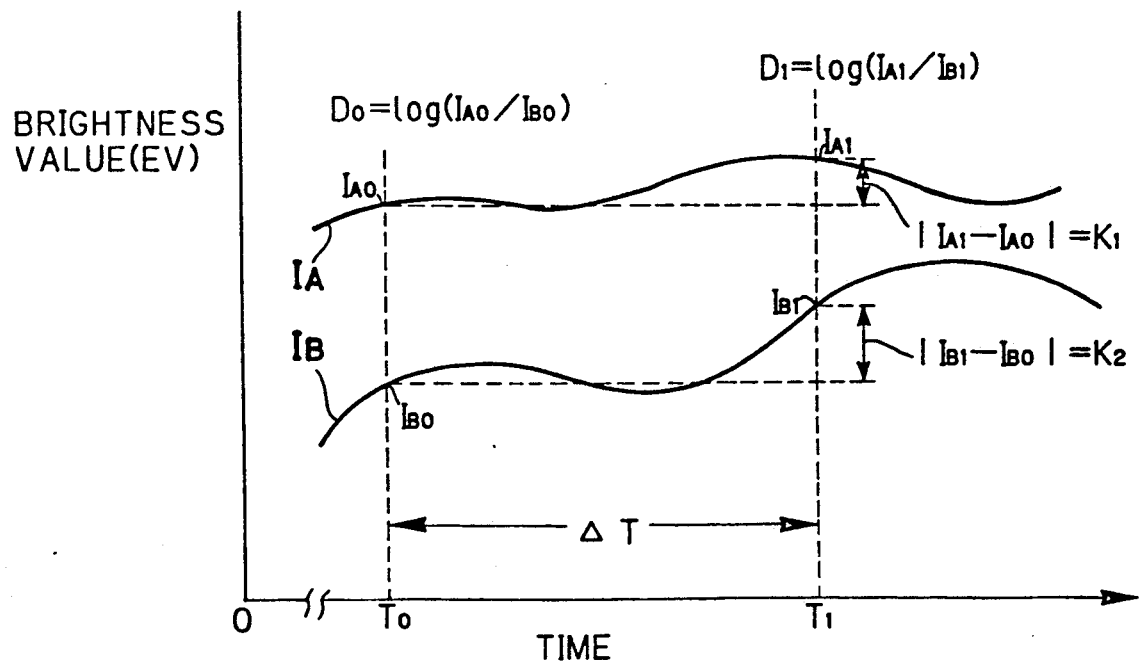
FIG. 3 illustrates a change in the brightness values.

In addition to the above-described exposure control by the MPU 30, the central area averaged brightness value $I_A$ is also compared of a predetermined time, and the contents of the scene change are estimated. Specifically, as illustrated in FIG. 3, assuming that the central area averaged brightness value $I_A$ and the overall image averaged brightness value $I_B$ are $I_{A0}$ and $I_{B0}$ at a time $T_0$, and are $I_{A1}$ and $I_{B1}$ at a time $T_1$ after a small time interval $\Delta T$, then the differences are given by $$K_1 = |I_{A1} - I_{A0}| \text{ and}$$

$$K_2 = |I_{B1} - I_{B0}|.$$

These values are compared with the threshold values $Th_1$ and $Th_2$. The comparison results are used to determine the scene condition states as illustrated in TABLE 1.

TABLE 1

|  | $K_1 \leq Th_1$<br>$K_2 > Th_2$ | $K_1 > Th_1$<br>$K_2 \leq Th_2$ | $K_1 > Th_1$<br>$K_2 > Th_2$ | $K_1 \leq Th_1$<br>$K_2 \leq Th_2$ |
|---|---|---|---|---|
| $|D_0| > Th_D$ | (1) | (2 - A)<br>(2 - B) | (3) | (4) |
| $|D_0| \leq Th_D$ | (5) | (6) | (7) | (8) |

$|D_0| > Th_D$ corresponds to the exposure control by the center weighted measuring at the time $T_0$, and $|D_0| \leq Th_D$ corresponds to the exposure control by the averaged brightness measuring. TABLE 1 is stored as a look-up table in a ROM 36.

The states (1) to (8) correspond to actual recorded scenes at the beginning and end of $\Delta T$ as in the following:

State (1): only background changes
State (2): principal subject moves
State (3): scene switches (or wholly changes)
State (4): substantially no change
State (5): only background changes
State (6): principal subject moves to the central area
State (7): scene switches; and
State (8): substantially no change.

As a sub-classification for the state (2), state (2-A) stands for $|D_1| > |D_0|$, and state (2-B) for corresponds to the $|D_1| \leq |D_0|$. An example of state (2-A) is a scene where a principal subject moves to the central area, and an example of state (2-B) is a scene where a principal subject moves from the central area to a peripheral area.

The MPU 20 performs the above processes and thereafter, the contents of scenes at the beginning and end of $\Delta T$ are estimated to accordingly change the exposure control speed. Specifically, for example, if the contents of the scenes are determined as changing in the order of states (1), (2-B), (5), (6) and (8), then the speed of adjusting the diaphragm 5 is lowered. However, if the contents of scenes are determined as changing in the order of states (2-A), (3), (4) and (7), then the speed of adjusting the diaphragm 5 becomes greater. This is done by outputting a drive speed control signal to the diaphragm driver 6 via a D/A converter 33.

A video camera commonly uses a zoom lens as the taking lens 3. A potentiometer 34 detects a zoom position signal, the MPU 30 calculates the focal length data of the taking lens 3 and the zoom speed data. The ROM 36 stores therein sequence programs and other necessary data for the above-described and similar operations to be executed by the MPU 30.

Figure 4:
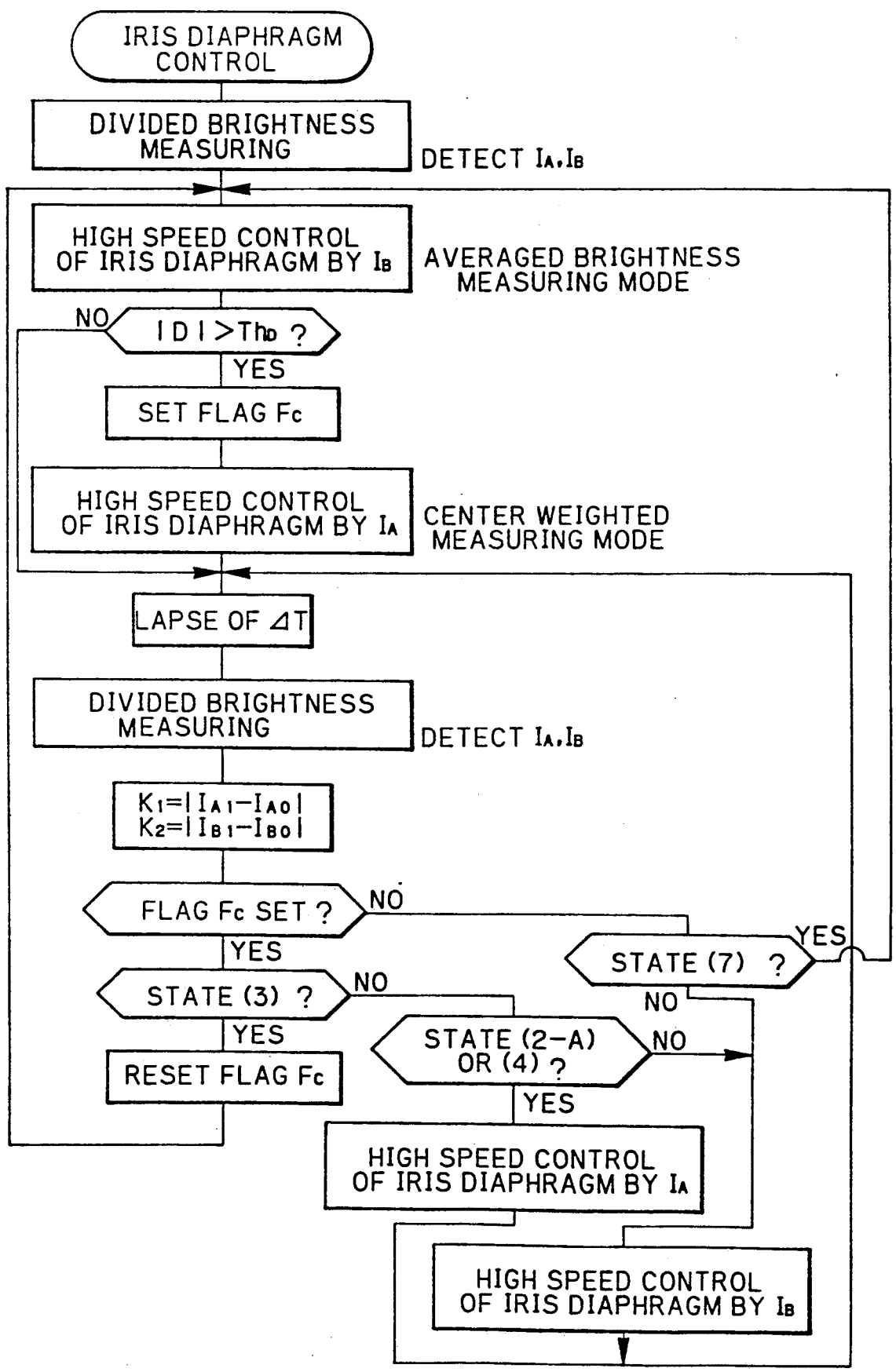
FIG. 4 is a flow chart for explaining the operation of the embodiment illustrated in FIG. 1.

The operation of the automatic exposure control apparatus constructed as set forth above will be further described with reference to the flow chart illustrated in FIG. 4. The diaphragm control starts when scenes begin to be picked up. At the same time, divided brightness measuring is carried out to obtain the averaged brightness values $I_A$ and $I_B$ of the central area 23A and the overall area 23B of the frame 23. In accordance with the overall image averaged brightness value $I_B$, the diaphragm control is first carried out through averaged brightness measuring value $I_B$, the diaphragm control is first carried out through averaged brightness measuring. In this case, the MPU 30 does not output a correction signal to the diaphragm controller 12. Thereby, the diaphragm driver 6 adjusts the diaphragm 5 so that the whole incident light amount of the image sensor 2 is made constant. Also in this case, the MPU 30 outputs a high speed signal as the drive speed control signal so that the diaphragm 5 is adjusted quickly in the averaged measuring mode. In the above manner, when scenes are begun to be picked up, the exposure control is carried out quickly in the averaged measuring mode so that the exposure amount of a principal subject can be prevented from departing greatly from the proper exposure control.

The value D is next calculated and compared with the value $Th_d$. If $|D| > Th_D$, the difference between the central area averaged brightness value $I_A$ and the overall image averaged brightness value $I_B$ is large, and there is a high possibility that the principal subject is located at the central area 23A. In such a case, if the diaphragm control is carried out in the averaged measuring mode, an improper exposure amount of the principal subject often results. Accordingly, if it is determined that $|D| > Th_D$, then a flag Fc is set which indicates that the control has selected the center weighted measuring mode, and the exposure correction data corresponding to the central area averaged brightness value $I_A$ is outputted from the MPU 30. The diaphragm 5 is therefore driven at a high speed in the center weighted measuring mode. If $|D| \leq Th_D$, then the averaged measuring mode continues to be carried out.

After such a diaphragm control and lapse of $\Delta T$, the divided brightness measuring is again executed to detect the new central area averaged brightness value $I_{B1}$ as illustrated in FIG. 3 for the comparison with the previous central area averaged brightness value $I_{A0}$ and the new overall image average brightness value $I_{B1}$ for the comparison with the previous overall image averaged brightness value $I_{B0}$. The values $K_1$ and $K_2$ are compared with the threshold values $Th_1$ and $Th_2$ to discriminate scenes in accordance with TABLE 1. The time $\Delta T$ may be made equal to a frame read period of the image sensor 2. In this case, it is not necessary to provide an additional timer for counting the time $\Delta T$.

With the obtained values K and $K_2$, the contents of the scenes at the beginning and end of $\Delta T$ are estimated. In the center weighted measuring mode, if the contents are estimated to be state (3), i.e., if both the central area and the overall image averaged brightness values $I_A$ and $I_B$ change greatly, the scene may have switched (or wholly changed) upon panning the video camera to a high extent for example. Accordingly, after releasing the center weighted measuring mode, the diaphragm control starts again for a new scene in the averaged brightness measuring mode.

If only the central area averaged brightness value $I_A$ changes greatly with less change of the overall image averaged brightness value $I_B$ and $|D_1| > |D_0|$, a scene may have a principal subject at the central area 23A moving in the rear light for example. In this case, with the center weighted measuring mode being unchanged, the diaphragm 5 is adjusted at a high speed in accordance with the newly detected central area averaged brightness value $I_{A1}$ and a change in the aperture size follows quickly. If both the central area overall image averaged brightness value $I_A$ and $I_B$ change very slightly, then the scenes having similar brightness distribution are picked up continuously. Accordingly, with the center weighted measuring mode being unchanged, the diaphragm control speed is made to follow at a high speed.

Figure 2:
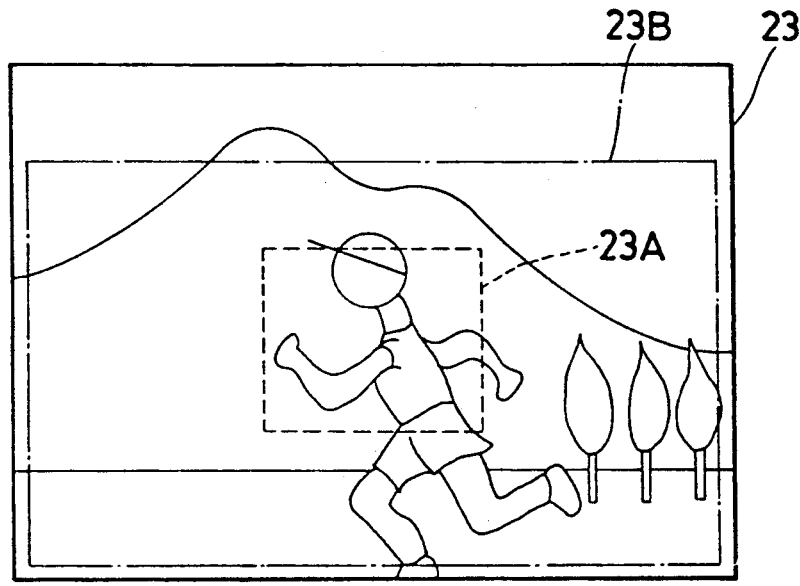
FIG. 2 illustrates the photometric areas within a scene.

If the contents are estimated to be state (2-B) and (3) under the center weighted measuring mode or a state other than state (7) under the averaged measuring mode, then a principal subject moves inside the frame 23 illustrated in FIG. 2 or the video camera is panned to follow the motion of a principal subject and only the background brightness changes for example. In such a case, the MPU 30 outputs a drive speed control signal by which the drive speed determined by the diaphragm driver 6 is lowered. Accordingly, even when the diaphragm aperture size signal is supplied to the diaphragm driver 6 by the diaphragm controller 12, the diaphragm driver 6 adjusts the diaphragm 5 slowly. Thereby, a rapid change of the exposure amount of the principal subject is prevented. During repetitive executions of the divided brightness measuring, if the central area and the overall image averaged brightness values $I_A$ and $I_B$ change, then a new diaphragm aperture size signal is inputted to the diaphragm driver 6 before the previous diaphragm control signal is completely adjusted. Accordingly, the diaphragm 5 is adjusted slowly in accordance with the continuously supplied signal of a new diaphragm aperture size.

In a case for the above described manner where a continuity between scenes is recognized, rather than the diaphragm 5 being controlled at a high speed in accordance with the background brightness change, a change of the diaphragm aperture size is slowly made which allows a stable exposure amount for the principal subject. Although the background is more or less sacrificed for such control, produced scenes have more natural images because the principal subject is given a stable exposure during consecutive scenes.

The above description is an example for determining the continuity between scenes in accordance with the photometric values of brightness signals obtained from the low-pass filter 16. The continuity between scenes can be determined from the spatial frequency components of the brightness signal. For instance, the output signal from the band-pass filter 17 as indicated by the dotted line in FIG. 1 is sent via the A/D converter 18 to the central area image adder 20. The continuity between scenes can be determined only by the output signal from the central area adder 20. The range finding area of an AF apparatus of a video camera is generally the central area 24 illustrated in FIG. 2, and the taking lens 3 is focussed relative to this area. The band-pass filter 17 has a characteristic for passing the signal components of a spatial frequency band which become high upon an in-focus condition. Therefore, the output signal from the central image area adder 20 is an integration value of the spatial frequency components within the in-focus area.

The integration values of the spatial frequency components at the beginning and end of $\Delta T$ are compared with each other. If there is a large change, the range finding object, i.e., a principal subject, is estimated to have been moved or changed. In such a case, the drive speed of the diaphragm 5 is made high. If the integration values of the spatial frequency components change only slightly, the drive speed of the diaphragm 5 is lowered.

Letting $\theta$ be the angle of view of the taking lens, 1 be the length of a principal subject within the frame 23 in a direction, for example, parallel to the longer side of the frame 23, and X be the distance to the actual principal subject, then the following equation stands:

$$1 \alpha 1/(\tan\theta \cdot X).$$

It is therefore possible to estimate a presence of a scene switching if the value 1 at the beginning and end of $\Delta T$ changes in excess of a predetermined range.

There is a case where the brightness distribution in the frame 23 as illustrated in FIG. 2 changes greatly because of zooming even if the video camera itself takes a fixed still posture. In such a case, it is usually preferable to consider that a scene has been switched, so that the drive speed of the diaphragm 5 is made high. Such a determination of scene switching may be made in accordance with the change amount for the time of the zoom position signal supplied from the potentiometer 34 illustrated in FIG. 1.

Figure 5:
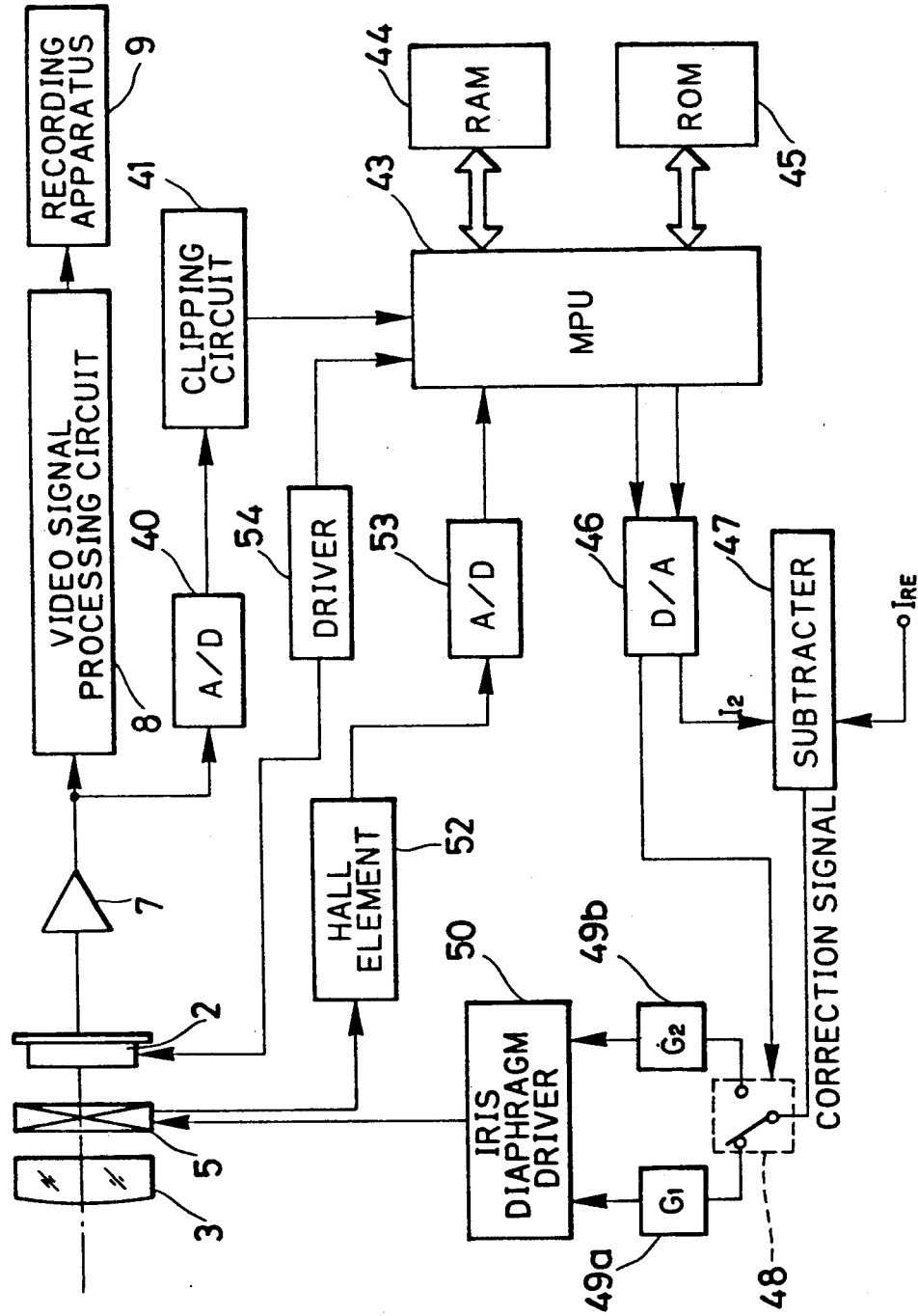
FIG. 5 is a block diagram illustrating another embodiment of the present invention wherein a difference of the changes in the brightness values of two areas in a scene is detected for accordingly selecting the diaphragm control speed in two steps.

FIG. 5 illustrates an embodiment wherein the diaphragm control speed is adjusted in accordance with a change in the difference between the brightness values of the central area and the overall image. Elements similar to the elements illustrated in FIG. 1 are represented by identical reference numerals. A video signal supplied from the image sensor 2 and the pre-amplifier 7 is supplied to an A/D converter 40 which performs a digital conversion at a sampling frequency of 3.5 MHz. The brightness signal in the video signal is converted into a digital signal. This digital brightness signal undergoes a knee compression by a clipping circuit 41 so that the high brightness digital is clipped at a maximum level and the low brightness signal is clipped at a minimum level. Similar processing operations are carried out by an image recording system, e.g., the image signal processing circuit 8.

The MPU 43 stores the clipped brightness signal data in the RAM 44, and divides the brightness signal data within the frame 23 into data for the central area 23A and the overall area 23B. Thereby, the central area and the overall image averaged brightness values $I_A$ and $I_B$ are obtained in a similar manner as in the previously described embodiment. The MPU 43 supplies a control signal corresponding to the obtained overall image averaged brightness value $I_A$ to a diaphragm driver 50 via a D/A converter 46, a subtracter 47, a switch 48, and one of gain setting units 49a and 49b.

The subtracter 47 is inputted with a reference photometry data $I_{RE}$ whose value allows a standard exposure amount to be obtained by taking into account the dynamic range of the image sensor 2. The subtracter 47 outputs a correction signal which makes "0" the difference between the reference photometry data $I_{RE}$ and the overall image averaged brightness value $I_B$. The switch 48 selects one of the gain setting units 49a and 49b in accordance with a switching signal supplied from the MPU 43 via the D/A converter 46.

The gains of the gain setting units 49a and 49b are set at $G_1$ and $G_2$ (where $G_1 > G_2$):, respectively, so that the correction signal supplied via the switch 48 is amplified by the selected gain and applied to the diaphragm driver 50. If the switch 48 selects the gain setting unit 49a, the diaphragm driver 50 responds to the correction signal at a high speed to adjust the diaphragm 5. On the other hand, if the switch 48 selects the other gain setting unit 49b, the diaphragm 5 responds to the correction signal slowly. A Hall element 52 detects the position data of the diaphragm 5 and supplies the data to the MPU 43 via an A/D converter 53. The diaphragm 5 is therefore feedback controlled in accordance with the reference photometry data $I_{RE}$. A driver 54 is constructed of the sensor driver 26 and the synchronous signal generator 27 as illustrated in FIG. 1.

Figure 6:
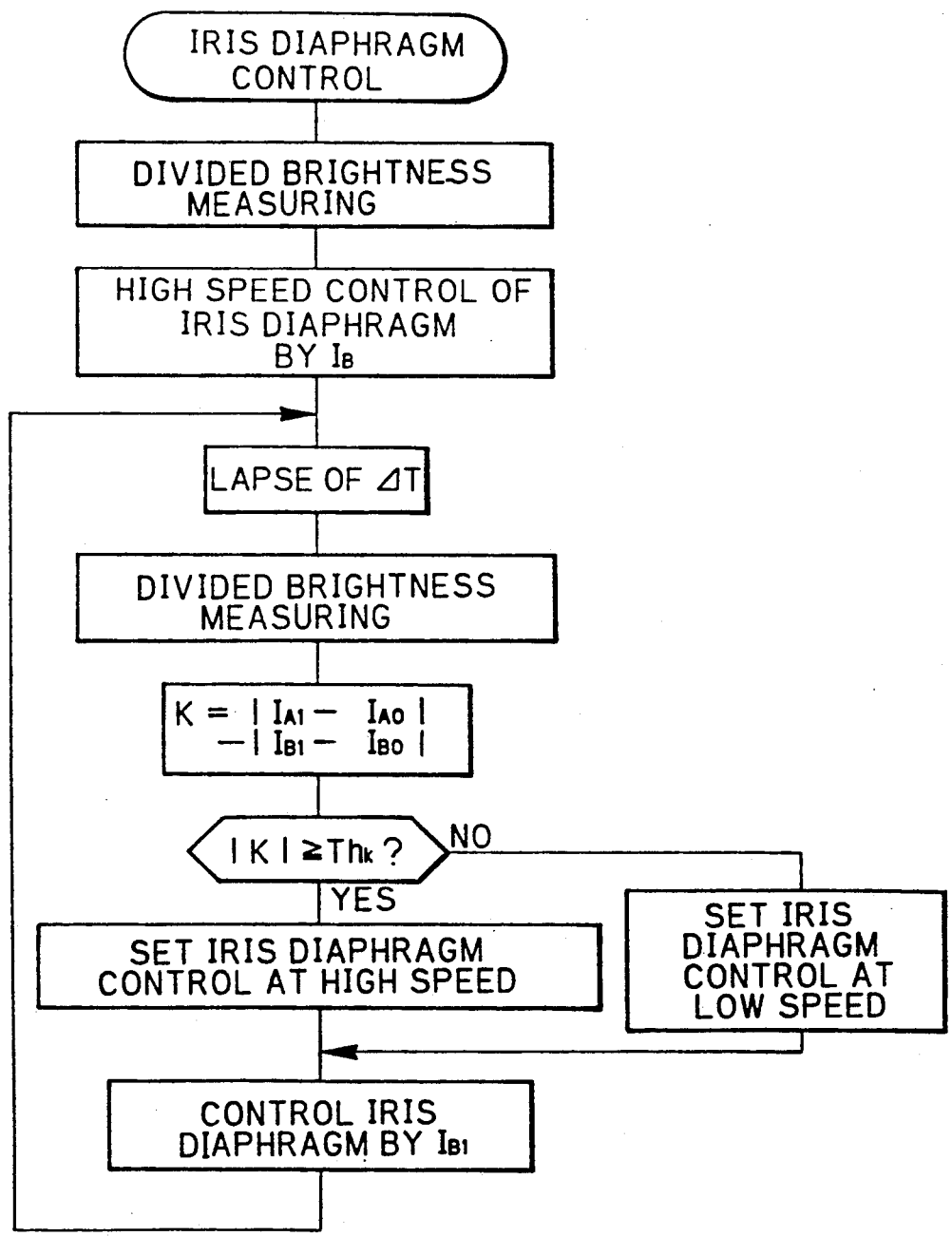
FIG. 6 is a flow chart for explaining the operation of the embodiment illustrating in FIG. 5.

The operation of the embodiment illustrated in FIG. 5 will then be described with reference to the flow chart illustrated in FIG. 6. This exposure control system always operates in the averaged measuring mode using the overall image averaged brightness value $I_B$. However, in a similar manner to the embodiment illustrated in FIG. 2, in addition to the overall frame averaged brightness value $I_B$, the central area averaged brightness value $I_A$ is detected and monitored with respect to time. Specifically, as illustrated in FIG. 3, the brightness difference K is calculated using the central area averaged brightness values $I_{A0}$ and $I_{A1}$ and the overall image averaged brightness values $I_{B0}$ and $I_{B1}$, respectively at the beginning and end of time $\Delta T$:

$$K = |I_{A1} - I_{A0}| - |I_{B1} - I_{B0}|.$$

The absolute value of K is compared with a threshold value $Th_K$. If $|K| \geq Th_K$, then the switch 48 selects the gain setting unit 49a, and if $|K| > Th_K$, then the gain setting unit 49a is selected. Therefore, if there is a large difference between changes in the central area and the overall image averaged brightness values $I_A$ and $I_B$ at the beginning and end of time $\Delta T$, the diaphragm 5 is controlled at a high speed. If there is only a small difference, then the diaphragm 5 is controlled slowly.

The brightness distribution of a scene changes in many cases if a scene is switched, even when the overall image averaged brightness value does not change greatly. Accordingly, the continuity between scenes can be determined on the basis of the value K. If there is a continuity between scenes, the diaphragm 5 is driven slowly to provide a smooth change of the exposure control for a principal subject even when the diaphragm 5 is required to be adjusted because of a change of the overall image averaged brightness value Is. The brightness of a face for a principal subject person will be prevented from being made intermittently bright and dark while continuously picking up scenes.

It is advantageous from the stand point of good image recording that the exposure control quickly follows by raising the response speed of the diaphragm when a scene changes. Also, if the contents of scenes are continuous in nature, then the exposure amount of a principal subject is made stable by lowering the response speed of the diaphragm even when the brightness distribution of the scenes more or less changes. Such an exposure control may be carried out by using the structure illustrated in FIG. 1 and modifying the programs in the ROM 36 to realize the following algorithm.

Specifically, in the embodiment illustrated in FIG. 1 the drive speed of the diaphragm 5 is changed by determining whether or not the absolute values $K_1$ and $K_2$ of the change amounts of the central area and the overall image averaged brightness values $I_A$ and $I_B$ are in excess of the predetermined threshold value by referring to the states described in TABLE 1. However, in this alternative, the drive speed of the diaphragm 5 is changed in accordance with the direction (+ or − direction) and how much the values of the average brightness values $I_{A1}$ and $I_{B2}$ illustrated in FIG. 3 change with respect to the previous averaged brightness values $I_{A0}$ and $I_{B0}$.

According to this method, the drive speed of the diaphragm 5 is selected in such a manner that the previous averaged brightness values $I_{A0}$ and $I_{B0}$ are subtracted from the central area and the overall image averaged brightness values $I_{A1}$ and $I_{B1}$ newly detected at each lapse of time $\Delta T$. Also, the subtraction results $\Delta S_1$ and $\Delta S_2$ are used in reference to a rule map of TABLE 2 or TABLE 3. TABLE 2 is used when the previous mode is the center weighted measuring mode, and TABLE 3 is used when the previous mode is the averaged measuring mode.

TABLE 2

|    | NB | NM | NS | ZO  | PS | PM | PB |
|----|----|----|----|-----|----|----|----|
| PB |    |    |    | F   | F  | VF | VF |
| PM |    |    |    | M   | F  | VF | VF |
| PS |    |    |    | S   | M  | F  | F  |
| ZN | F  | M  | S  | VS  | S  | M  | F  |
| NS | F  | F  | M  | S   |    |    |    |
| NM | VF | VF | F  | M   |    |    |    |
| NB | VF | VF | F  | F   |    |    |    |

TABLE 3

|    | NB | NB | NS | ZO  | PS | PM | PB |
|----|----|----|----|-----|----|----|----|
| PB |    |    |    | M   | F  | VF | VF |
| PM |    |    |    | S   | F  | VF | VF |
| PS |    |    |    | S   | M  | M  | M  |
| ZN | M  | M  | S  | VS  | S  | M  | M  |
| NS | M  | M  | M  | S   |    |    |    |
| NM | VF | VF | F  | S   |    |    |    |
| NB | VF | VF | F  | M   |    |    |    |

Symbols used in TABLE 2 and TABLE 3 have the following meanings:
PB: a large change amount in the "+" direction
PM: a medium change amount in the "+" direction
PS: a small change in the "+" direction
ZO: "0" change amount
NS: a small change amount in the "−" direction
NM: a medium change in the "−" direction
NB: a large change amount in the "−" direction
VF: an ultra-high drive speed for the diaphragm
F: a high drive speed for the diaphragm
M: a medium drive speed for the diaphragm
S: a low drive speed for the diaphragm
VS: an ultra-low drive speed for the diaphragm The rule maps are used in determining the drive speed of the diaphragm 5 in accordance with the values $\Delta S_1$ and $\Delta S_2$ while considering the previously set measuring mode. The diaphragm 5 is adjusted in accordance with the drive speed determined by the rule maps and by using the diaphragm aperture size corresponding to the newly detected value $I_{A1}$ or $I_{B1}$ as a target value. Accordingly, if the measuring period ($\Delta T$ is about 1/30 second) and the diaphragm drive speed is set to a low speed, then the target value of the diaphragm control is sequentially renewed so that the diaphragm 5 will not necessarily and completely follow the measured value. However, in such a case, there is a continuity between scenes so that the exposure amount of a principal subject becomes stable and natural images result.

TABLE 2 and TABLE 3 illustrate the correspondence between input data $\Delta S_1$ and $\Delta S_2$ and output data or diaphragm drive speeds. For such correspondence, Fuzzy interference may be used. Specifically, there are provided membership functions for determining the extent that the input data $\Delta S_1$ and $\Delta S_2$ are attributed to a set of PB to NB, and membership functions for determining the extent that the diaphragm drive speeds are attributed to a set of VS to VF. By using these membership functions, a Fuzzy set is determined and a group of Fuzzy sets is formed to obtain a diaphragm drive speed.

The output data (diaphragm drive speed data) for the input data $\Delta S_1$ and $\Delta S_2$ can be set off-line beforehand. The obtained output data are written as the output data in the rule maps of TABLE 2 and TABLE 3. Therefore, the output data can be searched from the input data at once so that a high speed and low cost control system is provided.

The present invention is not limited to the above-described embodiments. For example, although the drive speed of the diaphragm itself is changed so as to slow down the exposure control, the diaphragm drive speed may be made constant and the value of the exposure correction amount is gradually changed toward the target value. Furthermore, when determining a change in the contents of the scenes from the measured values, the central area may not only be compared with the overall image, but the central area may also be compared with three or more measuring areas and monitored relative to the time in the multi-pattern measuring.

Figure 7:
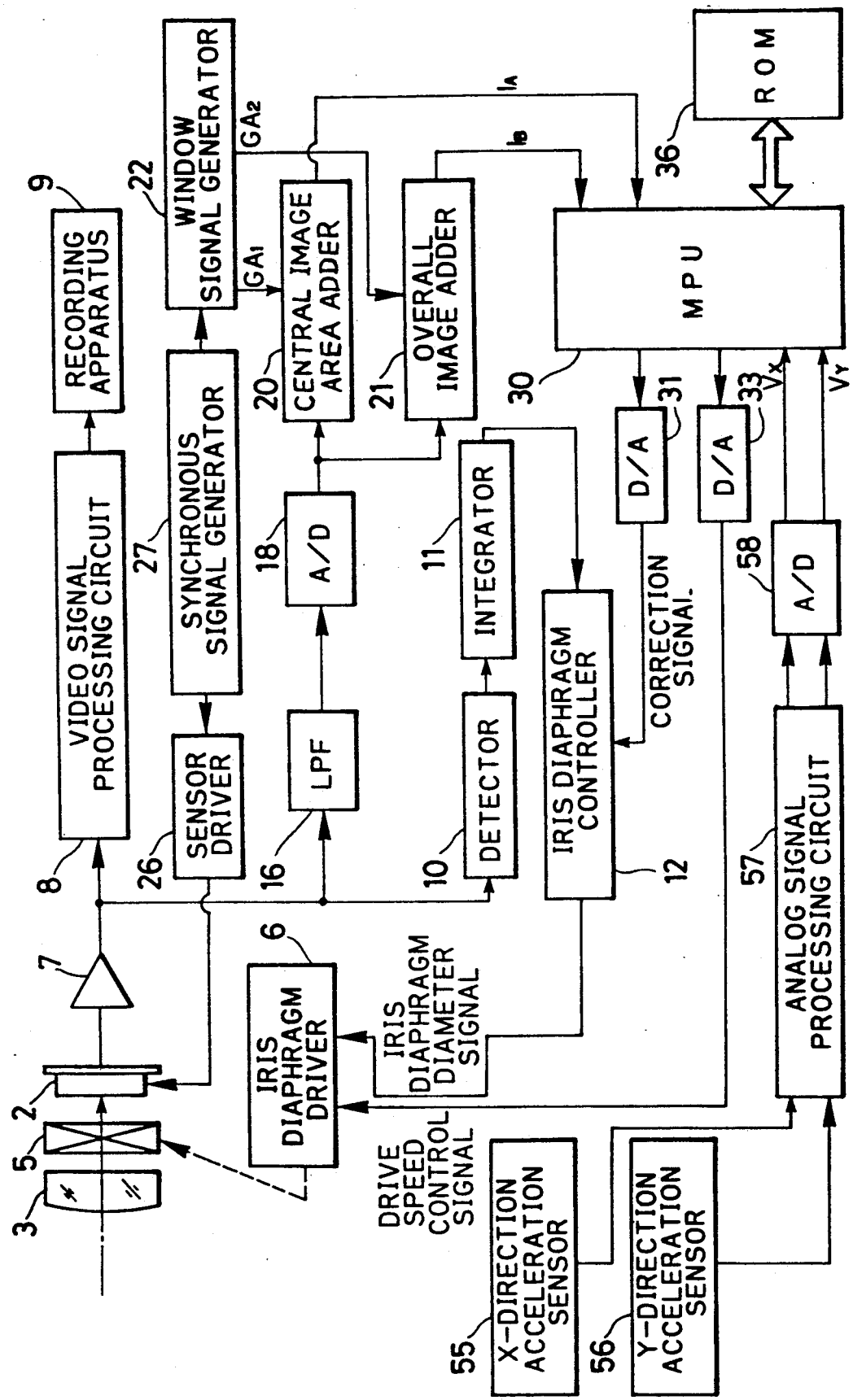
FIG. 7 is a block diagram illustrating an embodiment of the present invention wherein a motion of a video camera is detected for accordingly selecting a diaphragm control speed.

FIG. 7 illustrates an embodiment wherein the motion speed of a video camera is detected by an acceleration sensor, and the response speed of the exposure control is regulated in accordance with the detected motion speed. Elements similar to the elements illustrated in FIG. 1 are represented by identical reference numerals. In this embodiment, even if a video camera is moved abruptly during the panning of a principal subject, the exposure amount of the principal subject will not change unnaturally. Near the pick-up system, which includes the taking lens 3 and the image sensor 2, there are mounted an X-direction acceleration sensor 55 and Y-direction acceleration sensor 56 for measuring the acceleration applied to the video camera in the right-/left direction and the up/down direction, respectively. An angular velocity sensor manufactured by Matsushita Electric Industrial Co., Ltd. may be used as the acceleration sensors 55 and 56 which is constructed by a gyro signal detecting unit with two piezoelectric bimorphs disposed in a T-character shape, a tuning fork drive circuit, and other elements. The acceleration sensors 55 and 56 detect a motion of a video camera during the panning of the camera or shaking of the camera, and convert the change amount of the motion speed of the video camera into an electric signal which is supplied into an analog signal processing circuit 57. The analog signal processing circuit 57 amplifies and processes the input analog signal. Thereafter, the processed signal is supplied to an A/D converter 58 which in turn digitally converts the processed signal into the acceleration data and outputs the data to the MPU 30.

The MPU 30 compares a threshold value $Th_v$ with the absolute values $|V_x|$ and $|V_Y|$ of the acceleration data $V_x$ and $V_Y$ in the right/left direction and the up/down direction. The threshold value $Th_v$ is set such that acceleration caused by a slight camera shake is neglected when picking up scenes by holding the video camera by hand, and that the exposure control speed is changed for the case when a large acceleration caused by a rather big camera shake or by abruptly moving the video camera in order to follow a quick motion of a subject. If $V_x \geq Th_v$ or $V_Y \geq Th_v$, the MPU 30 slowly adjusts the speed of the diaphragm 5. If $|V_x| < Th_v$ and $|V_Y| < Th_v$, the MPU 30 adjusts the adjustment speed of the diaphragm 5 to a high value. The speed control is performed by outputting a drive speed control signal to the diaphragm driver 6 via the D/A converter 33.

Figure 8:
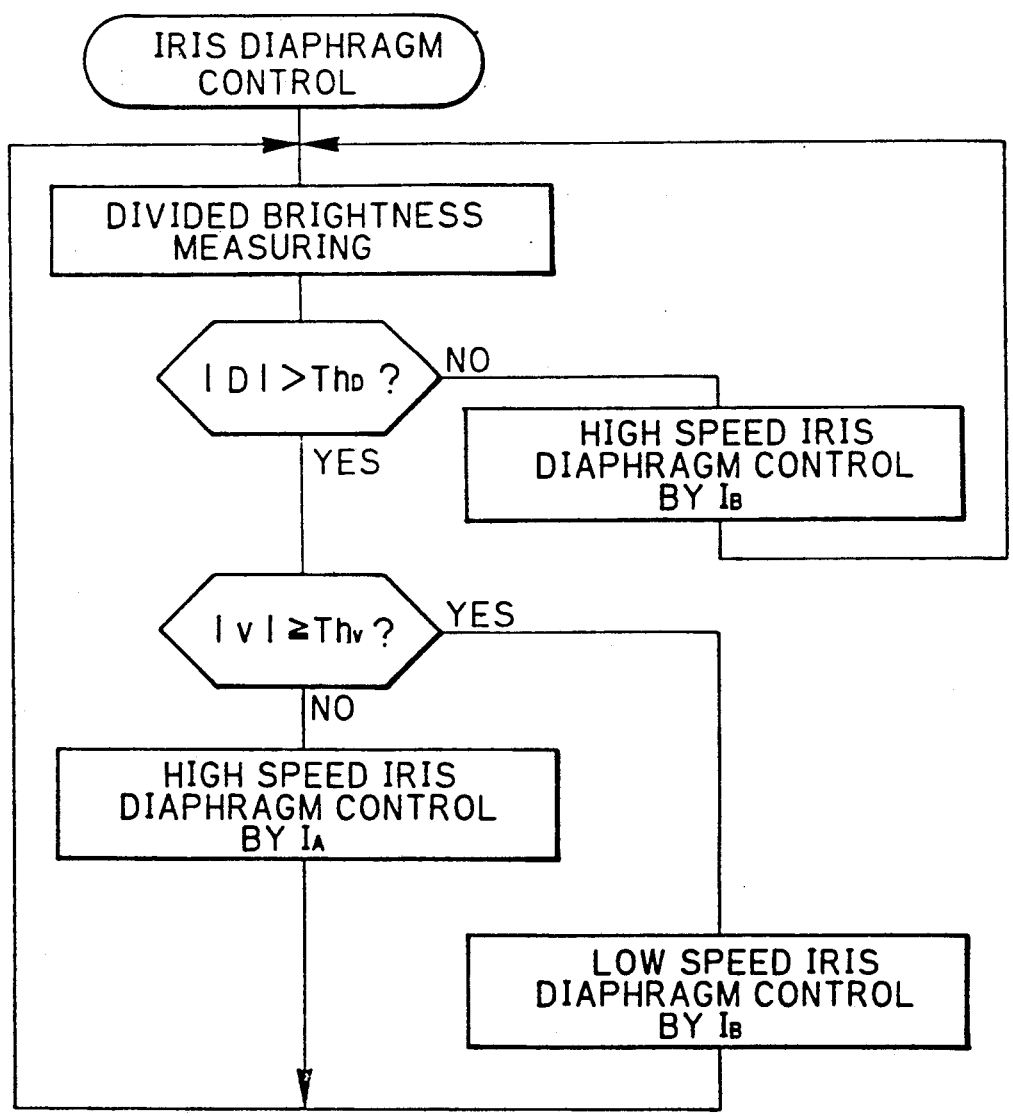
FIG. 8 is a flow chart for explaining the operation of the embodiment illustrated in FIG. 7.

FIG. 8 is a flow chart for explaining the operation of the embodiment illustrated in FIG. 7. When scenes begin to be picked up, the diaphragm control starts. Simultaneously, the divided brightness measuring is executed to obtain the averaged brightness values $I_A$ and $I_B$ of the central area 23A and the overall area 23B of the frame 23. A logarithm D of a ratio of the averaged brightness value $I_A$ to $I_B$ is calculated. The absolute value $|D|$ is compared with the value $Th_D$. If $|D| \geq Th_D$, then only a slight difference between the central area and the overall image averaged brightness values $I_A$ and $I_B$ exists. Accordingly, the diaphragm 5 is controlled at a high speed in accordance with the overall image averaged brightness value $I_B$.

If $|D| > Th_D$, then a large difference between the central area and the overall image averaged brightness values $I_A$ and $I_B$ exists. In such a case, there is an ample possibility that a principal subject is located at the central area 23A. Therefore, if the diaphragm control is executed in the averaged measuring mode, then an insufficient exposure amount of the principal subject often results. Accordingly, if it is determined that $|D| > Th_D$, then the exposure correction data corresponding to the central area averaged brightness value $I_A$ is outputted from the MPU 30.

If it is determined that $|D| > Th_D$, then the acceleration data $V_x$ and $V_Y$ in the respective directions are supplied from the X- and Y-direction acceleration sensors 55 and 56, and the absolute values $|V_x|$ and $|V_Y|$ are compared with the threshold value $Th_v$. If either $|V_x|$ and $|V_Y|$ is larger than or equal to $Th_v$, the MPU 30 causes the diaphragm 5 to be adjusted slowly in accordance with the exposure amount determined by the central area averaged brightness value $I_A$. If both $|V_x|$ and $|V_Y|$ are smaller than $Th_v$, the MPU 30 causes the diaphragm 5 to be adjusted quickly in accordance with the exposure amount determined by the central area averaged brightness value $I_A$.

Figure 9:
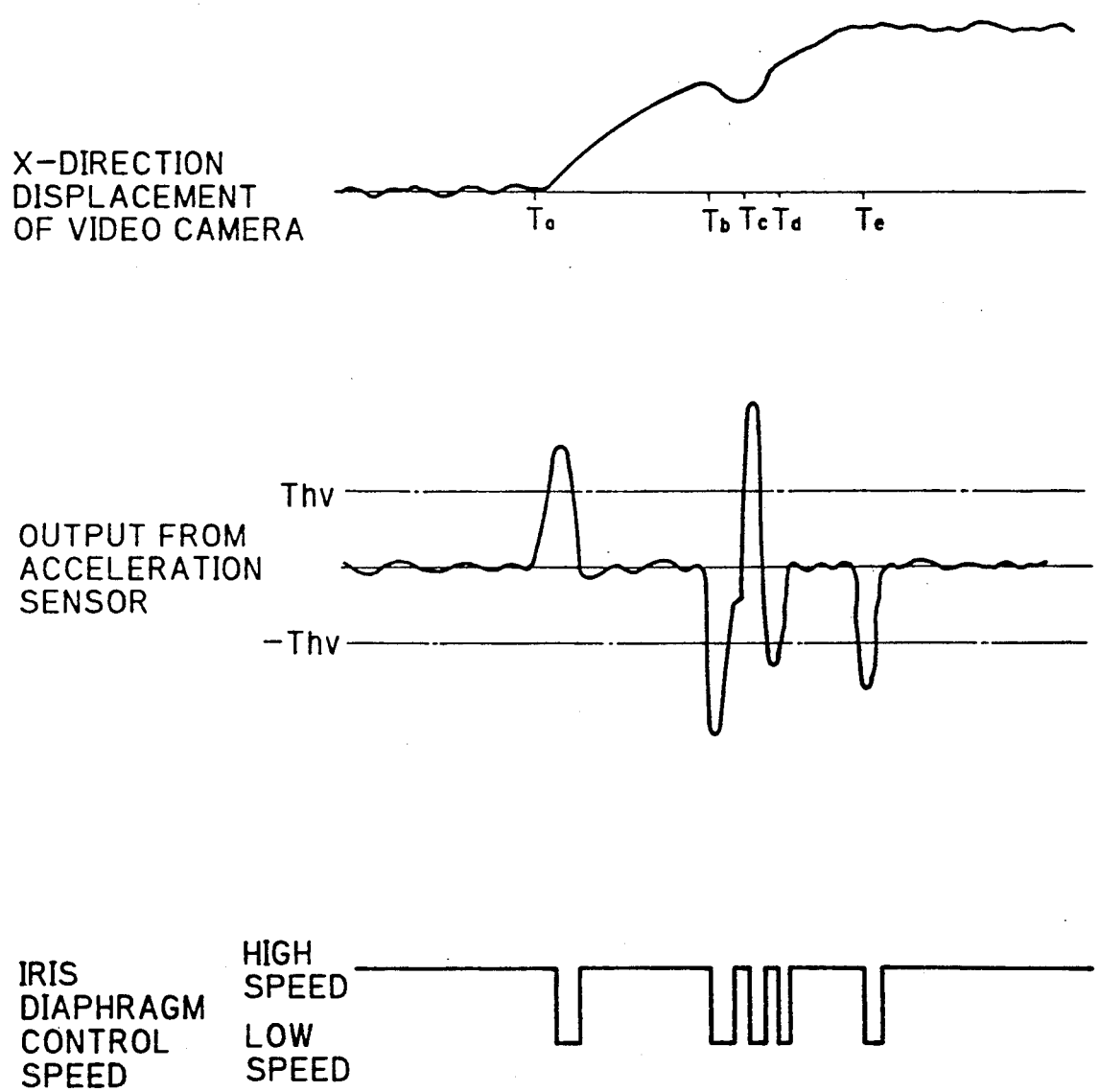
FIG. 9 is a timing chart for illustrating the relationship between the motion of a video camera and the diaphragm control speed.

FIG. 9 illustrates the relationship between the video camera motion and the diaphragm control speed. For simplicity of description, only the motion in the X-direction of a video camera is illustrated in FIG. 9. Before a time $T_a$ the video camera does not move at all except for slight movements caused by a camera shake. At the time $T_a$, a principal subject observed within the central area of a frame starts moving and the video camera moves abruptly to follow the motion of the principal subject. Accordingly, the output from the X-direction acceleration sensor 55 rises abruptly to exceed the threshold value $Th_v$. Thereby, the diaphragm drive speed is made slow.

After the time $T_a$, the video camera is panned at a constant speed to follow the principal subject. In this case, the acceleration is small and the diaphragm drive speed is made high. At a time $T_b$, the motion of the principal subject changes and the video camera is abruptly swung in a direction opposite to the previous direction. Therefore, the output of the X-direction acceleration sensor 95 becomes a large negative value and the diaphragm drive speed is made slow. Immediately thereafter at a time $T_c$, the video camera is swung back in the initial direction so that a large acceleration is applied and the diaphragm drive speed is controlled at a low speed.

Instantaneously, the diaphragm drive speed is temporarily controlled at a high speed. However, since an acceleration in the negative direction is applied at a time $T_d$ when the video camera is stopped from moving, the diaphragm drive speed is controlled at a low speed. After the time $T_d$, as the video camera is panned slowly, the diaphragm drive speed gradually becomes high. At a time $T_e$ when the principal subject and the video camera are stopped, an acceleration in the negative direction is applied to the video camera and the diaphragm drive speed is switched to a low speed. After the time $T_e$ while the video camera is fixed and relatively still with the only motion caused by a slight camera shake, the diaphragm drive speed is again controlled to a high speed.

In order to prevent an extraordinary deviated exposure amount of a principal subject from a proper exposure amount at the start of picking up scenes, it is preferable to first control the diaphragm by the averaged brightness measuring based on using the overall image averaged brightness value $I_B$. In this case, the MPU 30 does not output the correction signal to the diaphragm controller 12 so that the diaphragm 5 is controlled to make the whole incident light amount constant to the image sensor 2. In addition, the MPU 30 outputs a high speed signal as the drive speed control signal.

There may be provided a scene stabilizing mechanism by which the pick-up system having the taking lens and the CCD is rotated or moved in the direction for cancelling out the acceleration applied to the video camera. In such a scene stabilizing mechanism a conventional apparatus, the pick-up system is held in space by two shafts in the right/left and up/down directions, and the shafts are rotated by two actuators to move the pick-up system in the right/left and up/down directions.

Figure 10:
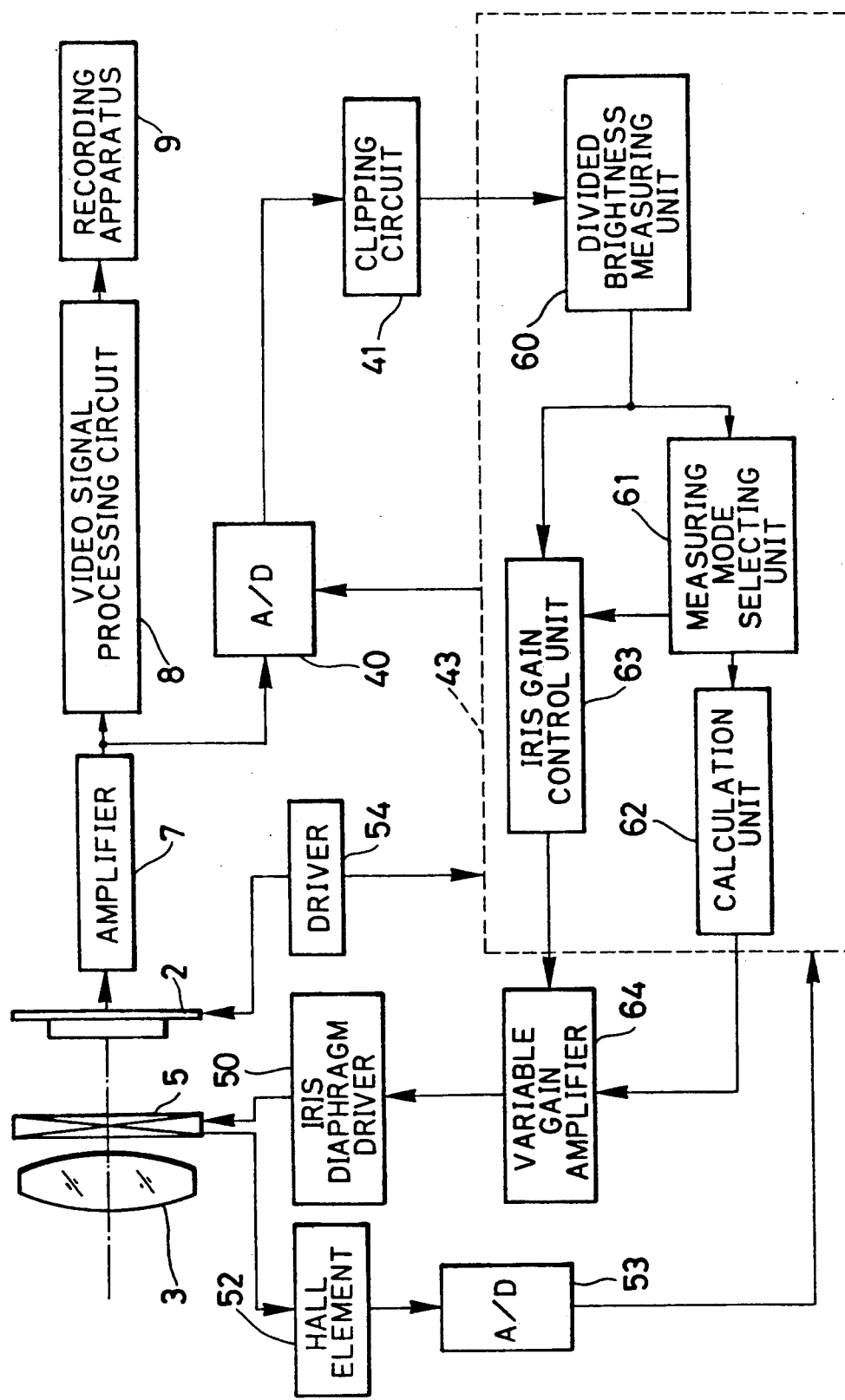
FIG. 10 is a block diagram illustrating an embodiment of the present invention wherein the diaphragm control speed is selected in accordance with the change in the overall image averaged brightness value.
Figure 11:
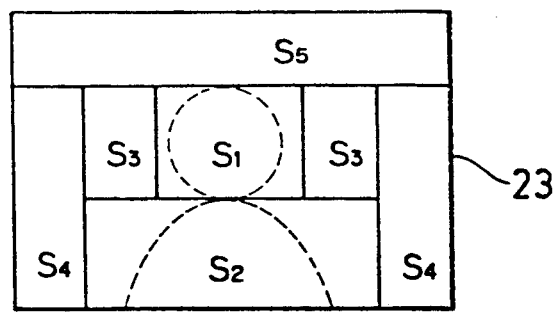
FIG. 11 illustrates the areas for divided brightness measuring.

FIG. 10 illustrates an embodiment wherein the exposure amount is determined by the divided brightness measuring, and the exposure control speed is changed in accordance with the value of the scene brightness value and in accordance with whether or not there is a continuity between scenes. Elements similar to the elements illustrated in FIG. 5 are represented by identical reference numerals. In this embodiment, if there is a continuity between scenes, a stable exposure control is executed by smoothing the abrupt change in exposure even when the brightness distribution of scenes changes, without lowering the tracking ability of the diaphragm when the brightness of a scene changes greatly. The MPU 43 illustrated by functional blocks is constructed of a divided brightness measuring unit 60, a measuring mode selecting unit 61, a calculating unit 62, and a diaphragm gain control unit 63. The divided brightness measuring unit 60 enters one frame video signals in a frame memory (not shown), and divides the scene 23 into five areas $S_1$ to $S_5$ as illustrated in FIG. 11 to obtain average brightness values $B_1$ to $B_4$ (in EV units) of video signals $S_1$ to $S_4$ added together. Average brightness values $B_{ijk}$ (i, j, k = 1 to 4) for a combination of areas, and the average brightness value $S_{1234}$ for the areas $S_1$ to $S_4$. The area $S_5$, where a principal subject is rarely located, is excluded from the calculation.

The measuring mode selecting unit 61 discriminates a scene by comparing the average brightness values $B_1$ to $B_4$ with $B_{ijk}$ and thereby selecting an equation (1) to (7) for a discriminated scene. In accordance with the equation selected by the measuring mode selecting unit 61, the calculation unit 62 calculates a multi-pattern measured brightness value C by which a proper exposure can be obtained. Examples of equations (1) to (7) are as follows:

$C_1 = B_{123}$  Equation (1)

$C_2 = (B_1 \times W_1 + B_2 \times W_2 + B_3)/(W_1 + W_2 + 1)$  Equation (2)

$C_3 = (B_{12} \times W_3 + B_3 + B_4)/(W_3 + 2)$  Equation (3)

$C_4 = (B_{13} \times W_4 + B_2 + W_5 + B_4)/(W_4 + W_5 + 1)$  Equation (4)

$C_5 = (B_{134} \times W_6 + B_2)/(W_6 + 1)$  Equation (5)

$C_6 = (B_{123} \times W_7 + B_2)/(W_7 + 1)$  Equation (6)

$C_7 = B_{1234}$  Equation (7)

Symbols $W_1$ to $W_7$ are the weighting coefficients which take values (EV), for example as in the following: $W_1 = 10$, $W_2 = 1$ $W_3 = 10$, $W_4 = 10$, $W_5 = 1$, $W_6 = 10$, and $W_7 = 10$.

The scene brightness value calculated by the calculation unit 62 is sent to the variable gain amplifier 64 for controlling the response speed of the diaphragm 5. The diaphragm gain control unit 63 compares the average brightness value $B_{1234}$ obtained by the divided brightness measuring unit 60 with the previous average brightness value of $B_{1234}$, and also determines if the equation selected by the measuring mode selecting unit 61 is the same as the previously selected mode. In accordance with the comparison and determination results, a gain control signal is outputted for changing the gain level of the variable gain amplifier 64.

The operation of the embodiment illustrated in FIG. 10 will be described with reference to the flow chart of FIG. 12. The exposure control sequence illustrated in FIG. 12 is executed, for example, at an interval of 1 second. After the video signal is digitally converted and clipped, the signal is sent to the divided brightness measuring unit 60 and written in the frame memory. The divided brightness measuring unit 60 divides the frame 23 into five areas $S_1$ to $S_5$ and calculates the average brightness values $B_1$ to $B_4$, $B_{ijk}$ (i, j, k = 1 to 4), and $B_{1234}$. These average brightness values are written in a memory of the MPU 43 and read by the measuring mode selecting unit 43 if necessary. The average brightness value $B_{1234}$ is inputted to the diaphragm gain control unit 63 and compared with the previous average brightness value of $B_{1234}$.

The measuring mode selecting unit 61 first calculates the brightness differences between respective areas. It is assumed that the target value of the brightness level of the frame is set such that the video output becomes 60 IRE (gamma 0.45 series), and is represented by $B_{ref}$. The brightness difference $D_0$ between the target value $B_{ref}$ and the average brightness value $B_{123}$ of the areas $S_1$ to $S_3$ is obtained by the following equation, where the base of log is a natural logarithm "e":

ti $D_0 = \log(B_{123}/B_{ref})/\log 2$.

The brightness difference $D_1$ between the areas $S_1$ and $S_3$ is obtained by:

$D_1 = \log(B_1/B_3)/\log 2$.

The brightness difference $D_2$ between the areas $S_1$ and $S_2$, is given by:

$D_2 = \log(B_1/B_2)/\log 2$.

The brightness difference $D_3$ between the average brightness value $B_{13}$ of the areas $S_1$ and $S_3$ and the average brightness value $B_4$ of the area $S_4$ is given by:

$D_3 = \log(B_{13}/B_4)/\log 2$.

Figure 13A:
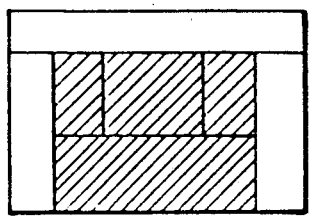
FIGS. 13A to 13G illustrate the areas selected by scene discrimination.

The measuring mode selecting unit 61 compares the threshold values $Th_0$ to $Th_3$ with the absolute values $|D_0|$ to $|D_3|$ of the brightness differences $D_0$ to $D_3$ for discriminating a scene, selecting one of the equations (1) to (7) for a discriminated scene and calculating the multi-pattern measured brightness value C. Specifically, at a determination step J10, $|D_0|$ is compared with the threshold value $Th_0$ (e.g., 3 EV). If the condition $|D_0| \geq Th_0$ is not satisfied, then the present multi-pattern measured brightness value C is considerably different from the target value $B_{ref}$. For instance, such a case occurs immediately after power-on of a video camera, or when panning quickly from a dark room to a bright outdoor field. In such a case, it takes a long time for the feedback control of the diaphragm 5 to become stable when a scene discrimination is made and thereafter the calculation is performed. In order to shorten this time, it is assumed that a principal subject is located at the hatched area in FIG. 13A, and the equation (1) is selected to calculate the multi-pattern measured brightness value $C_1$.

Figure 13B:
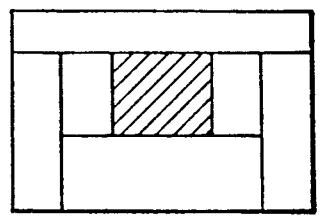
Figure 13C:
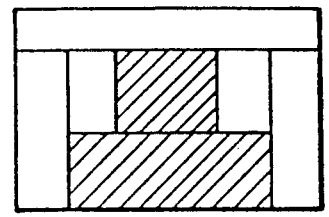

At determination step J11, if $|D_0| \geq Th_0$ is not satisfied at determination step J10, then $|D_1|$ is compared with the threshold value $Th_1$ (e.g., 0.5 EV). If $|D_151 \geq Th_1$ is satisfied, then it is assumed that the principal subject, e.g., the face of the principal subject located at the area $S_1$. In this case, at determination step J12, $|D_2|$ is compared with the threshold value $Th_2$ (e.g., 0.75 EV). If $|D_2| \geq Th_2$ is satisfied, then the brightness is different between the face and clothing of the principal subject. Accordingly, as illustrated in FIG. 13B, the equation (2) is related which emphasizes the area $S_1$ where the face is located, and the multi-pattern measured brightness value $C_2$ is calculated. If $|D_2| \geq Th_2$ is not satisfied, then there is scarcely a brightness difference between the face and clothing of the principal subject. Accordingly, as illustrated in FIG. 13C, the equation (3) is selected for emphasizing the average brightness value $B_{12}$ of the areas $S_1$ and $S_2$, and the multipattern measured brightness value $C_3$ is calculated.

Figure 13D:
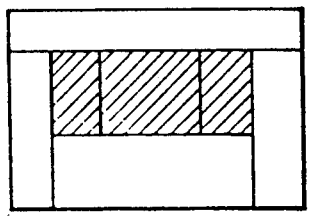

If $|D_1| \geq Th_1$ is not satisfied, then there is no brightness difference between the areas $S_1$ and $S_3$. In this case, at determination step J13, $|D_2|$ is compared with the threshold value $Th_2$. If $|D_2| \geq Th_2$ is satisfied, then there is no brightness difference between the areas $S_1$ and $S_3$ and there is a brightness difference between the areas $S_1$ and $S_2$. Accordingly, at step J14 it is determined whether $|D_3| \geq Th_3$ (e.g., 0.5 EV) is satisfied. If this condition is satisfied, then there is a difference between the average brightness value $B_{13}$ of the areas $S_1$ and $S_3$ and the average brightness value $B_4$ of the area $S_4$. Accordingly, as illustrated in FIG. 13D, the equation (4) is selected for emphasizing the average brightness value $B_{13}$, and the multi-pattern measured brightness value $C_4$ is calculated.

Figure 13E:
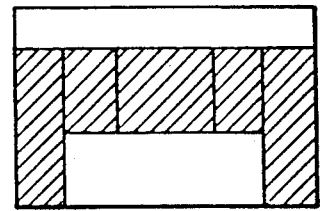
Figure 13F:
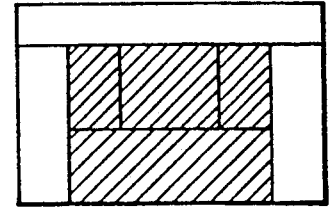
Figure 13G:
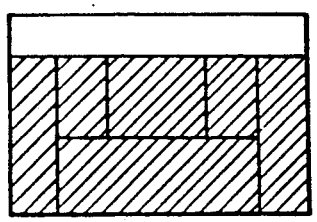

If $|D_3| \geq Th_3$ is not satisfied, that there is no difference between the average brightness value $B_{13}$ of the areas $S_1$ and $S_3$ and the average brightness value $B_4$ of the area $S_4$ as illustrated in FIG. 13E. Therefore, the equation (5) is selected for emphasizing the average brightness value $B_{134}$ of the areas $S_1$, $S_3$ and $S_4$, and the multi-pattern measured brightness value $C_5$ is calculated.

If $|D_2| \geq Th_2$ is not satisfied at determination step J13, then there is no brightness difference between areas $S_1$, $S_2$, and $S_3$ and the average brightness value $B_{123}$ is near the target value $B_{ref}$. Therefore, it is determined whether $|D_3| \geq Th_3$ is satisfied. If this condition is satisfied, then the equation (6) is selected for emphasizing the average brightness value $B_{123}$, and the multi-pattern measured brightness value $C_6$ is calculated as illustrated in FIG. 10F. If $|D_3| \geq Th_3$ is not satisfied, then there is no brightness difference between the areas $S_1$ to $S_4$ so that the equation (7) is selected and the multi-pattern measured brightness value $C_7$ is calculated.

While the divided brightness measuring is periodically executed at an interval of about one second, the diaphragm gain controller 63 obtains a difference between the present average brightness value $B_{1234}$ and the previous average brightness value of $B_{1234}$. If this difference is larger than the threshold value $Th_4$ (e.g. 2 EV), then there is an abrupt change in the subject brightness or there is abrupt panning. To compensate for these conditions, the diaphragm 5 is controlled at a high speed and gain control signal is sent to the variable gain amplifier 22.

If the difference between the present and previous average brightness values of $B_{1234}$ is smaller than the threshold value $Th_4$, then it is determined whether the equation selected by the measuring mode selecting unit 61 is different from the previously selected equation. If the modes are different, although there is no large change in the overall image brightness, then the brightness distribution of the image changes, e.g., a relatively slow panning or a slow motion of the subject. In such a case, although the image changes slowly (there is some continuity between scenes), there is an ample possibility that the multi-pattern measured brightness value changes discontinuously because of switching between equations. If the diaphragm 5 is controlled at high speed so as to obtain a diaphragm aperture size corresponding to such a changing multi-pattern measured brightness value, then the scene brightness may often change unnaturally. As a result, the gain control signal is supplied to the variable gain amplifier 64 for lowering the diaphragm change speed.

If the difference between the present and previous average brightness values of $B_{1234}$ is smaller than the threshold value $Th_4$ and the presently selected and previously selected equations are the same, then there is no large difference of the overall image brightness and the brightness distribution of the overall image does not change. Therefore, even if the diaphragm 5 is controlled at a high speed, the image will not become unnatural. Accordingly, the diaphragm gain control unit 63 sends the gain control signal to the variable gain amplifier 64 so as to raise the diaphragm change speed.

The variable gain amplifier 64 changes the control speed of the diaphragm driver 50 in accordance with the gain control signal outputted from the diaphragm gain control unit 63. In accordance with the new control speed, the diaphragm driver 50 sets the diaphragm 5 to the diaphragm aperture size corresponding to the multi-pattern measured brightness calculated by the selected equation.

Figure 14:
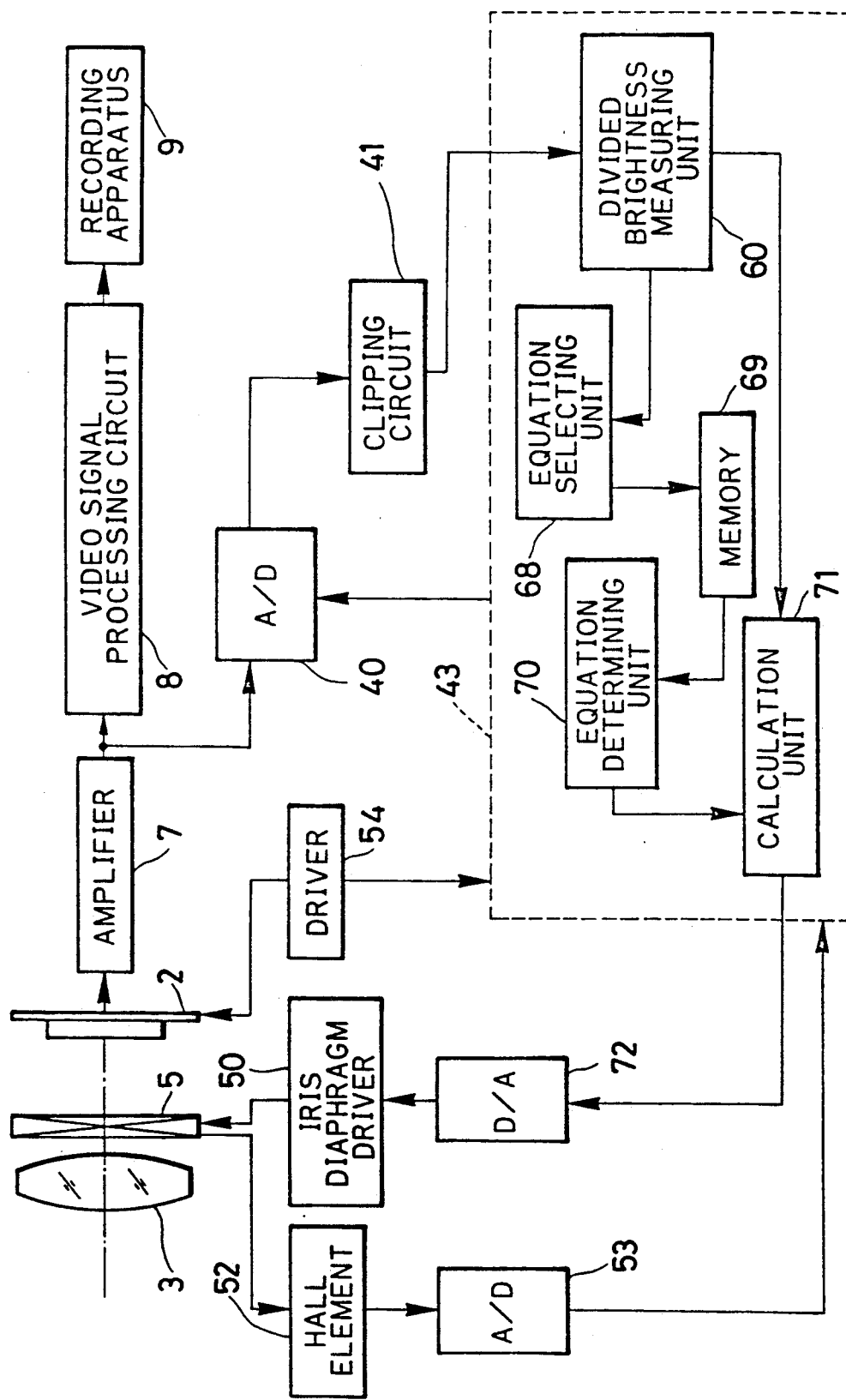
FIG. 14 is a block diagram illustrating an embodiment of the present invention wherein a multi-pattern measured brightness value is calculated by using a most frequently selected equation.
Figure 15:
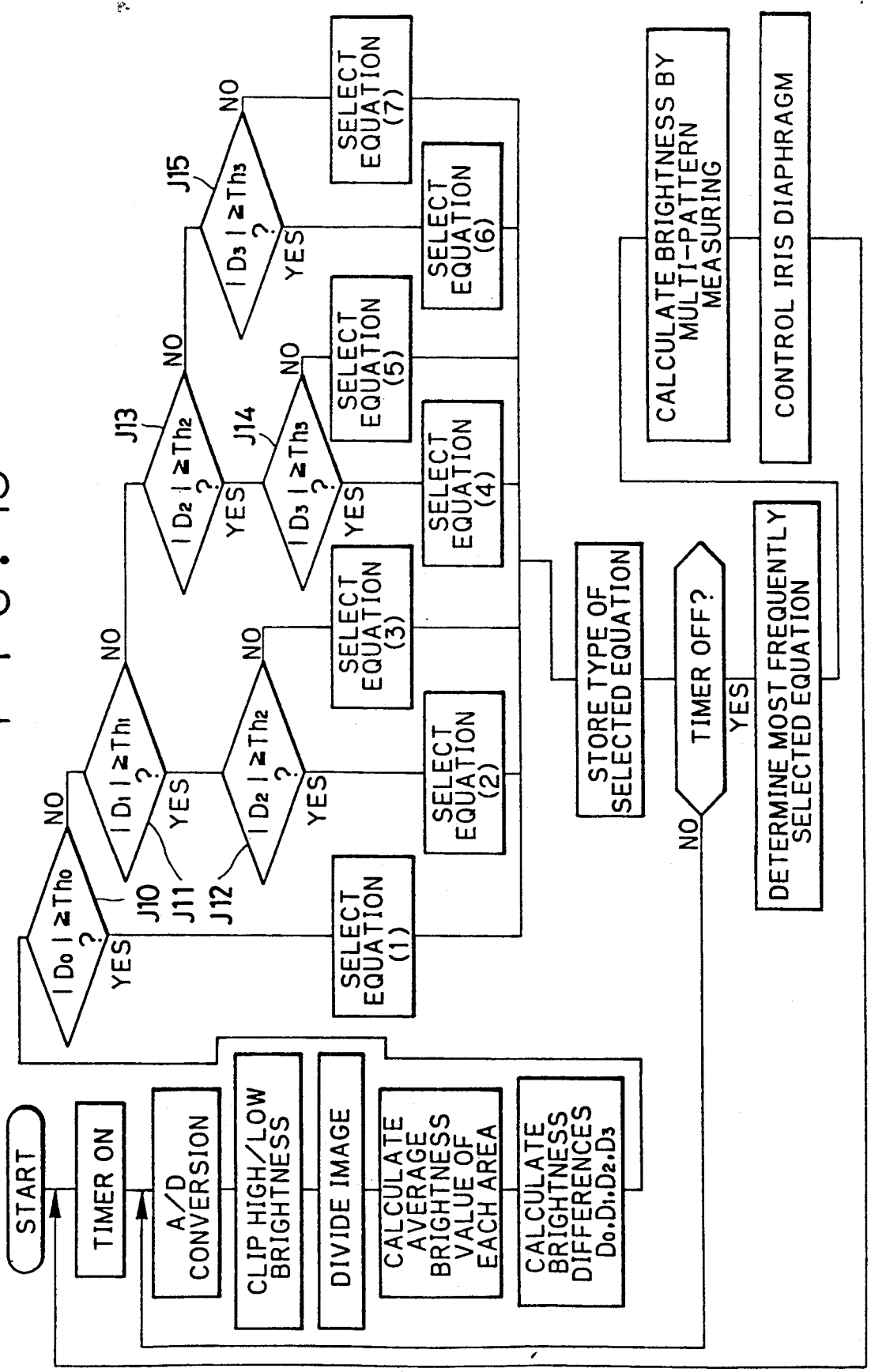
FIG. 15 is a flow chart for explaining the operation of the embodiment illustrated in FIG. 14.
Figure 16:
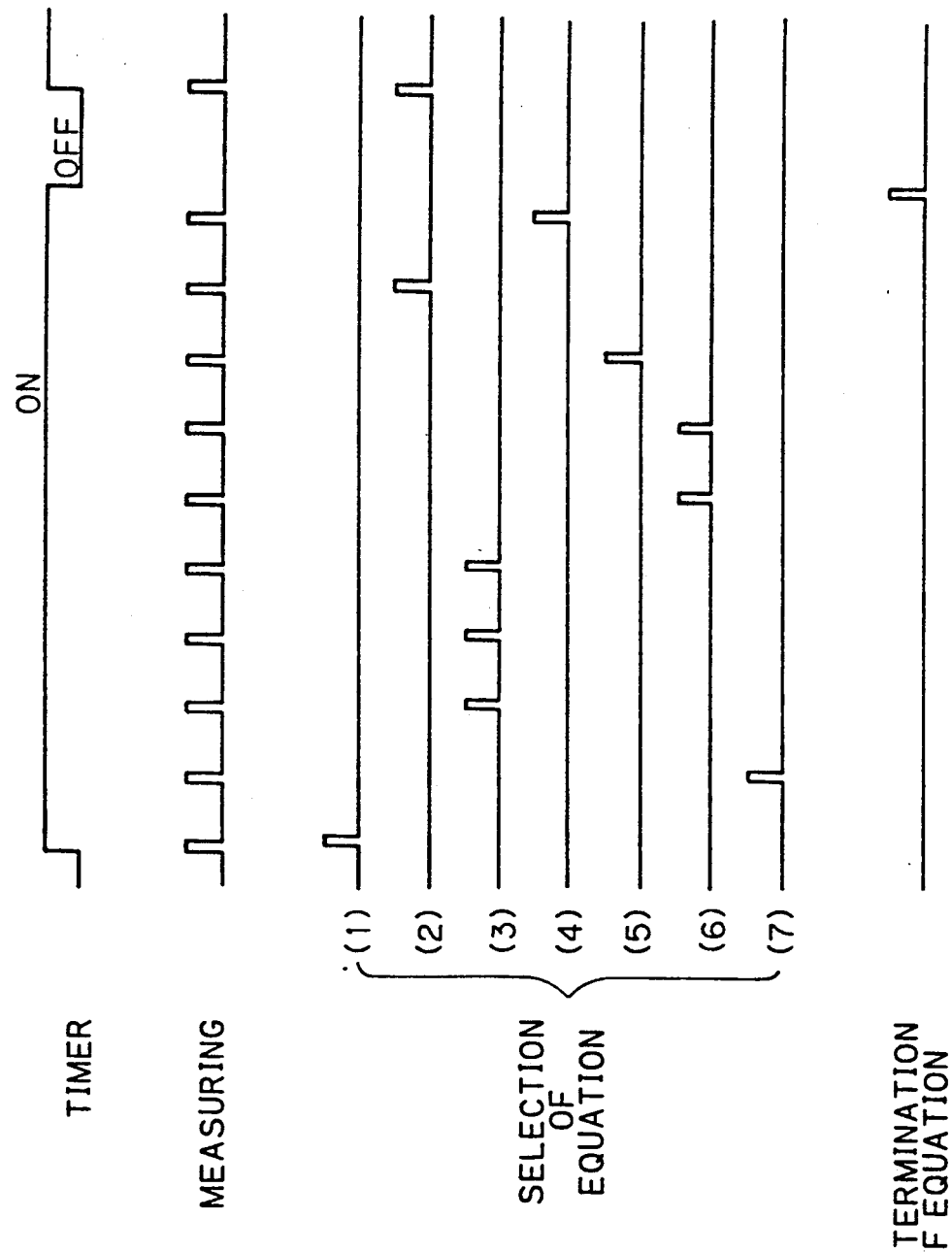
FIG. 16 is a timing chart for illustrating the operation of determining an equation at a predetermined time interval.

In the above embodiment, the multi-pattern brightness value is calculated by selecting an equation at each measuring. The multi-pattern measured brightness value may be calculated by selecting the same equation for every predetermined time period and using the equation for respective measurings during such a time period. With this arrangement, the exposure control becomes stable, and natural images may be recorded without any fluctuations. FIGS. 14 to 16 illustrate such an embodiment. Elements similar to the elements illustrated in FIG. 10 are represented by identical reference numerals. The MPU 43 includes a divided brightness measuring unit 60, an equation selecting unit 68, a memory 69, an equation determining unit 70 and a calculation unit 71. An A/D converter 72 is also provided.

The equation selecting unit 68 discriminates a scene at each divided brightness measuring, selects one of the equations (1) to (7), and writes the type of the selected equation in the memory 69. The equation determining unit 70 derives the equation most frequently selected during a predetermined period for the memory 69. The measured value calculation circuit 21 calculates a multi-pattern measured brightness value in accordance with the equation selected by the equation selecting circuit 20.

The operation of the embodiment illustrated in FIG. 14 will be described next with reference to FIGS. 15 and 16. The MPU 43 turns on an internal timer of the MPU 43 in accordance with the program sequence. The image signal after being clipped is sent to the divided brightness measuring unit 60 for calculating the average brightness values of the respective areas as described previously. The equation selecting unit 68 compares the threshold values $Th_0$ to $Th_3$ with the absolute values $|D_0|$ to $|D_3|$ of the brightness differences $D_0$ to $D_3$ for discriminating a scene, and selects an optimum equation for the scene. The divided brightness measuring and the equation selecting are repeated, for example, ten times until the timer is turned off (after $\frac{1}{3}$ second) as illustrated by the timing chart of FIG. 16, and each time the number of a selected equation is stored in the memory 69. At the time when the timer is turned off, the equation determining unit 70 chooses the most frequently selected equation from the equations stored in the memory 69 (in the example illustrated in FIG. 5, the equation (2)), and the number thereof is sent to the calculation unit 71 The calculation unit 71 calculates the multi-pattern measured brightness value at each divided brightness measuring by using the same equation until the next equation is determined. Therefore, in this embodiment, the multi-pattern measured brightness value is calculated by using the same equation, and the equation is changed every ⅛ second. In accordance with the multi-pattern measured brightness value calculated by the calculation unit 71, the MPU 43 drives the diaphragm 5 via the D/A converter 72 to set the diagram 5 at an optimum diaphragm aperture size.

If there are two or more frequently selected equations, the frequency is probably determined by considering a plurality of equations selected during the previous measuring. Immediately after power-on, because it is not possible to determine the equation, it is preferable to select the equation (1), assuming that the image of a principal subject is located at the central area of a scene.

Figure 17:
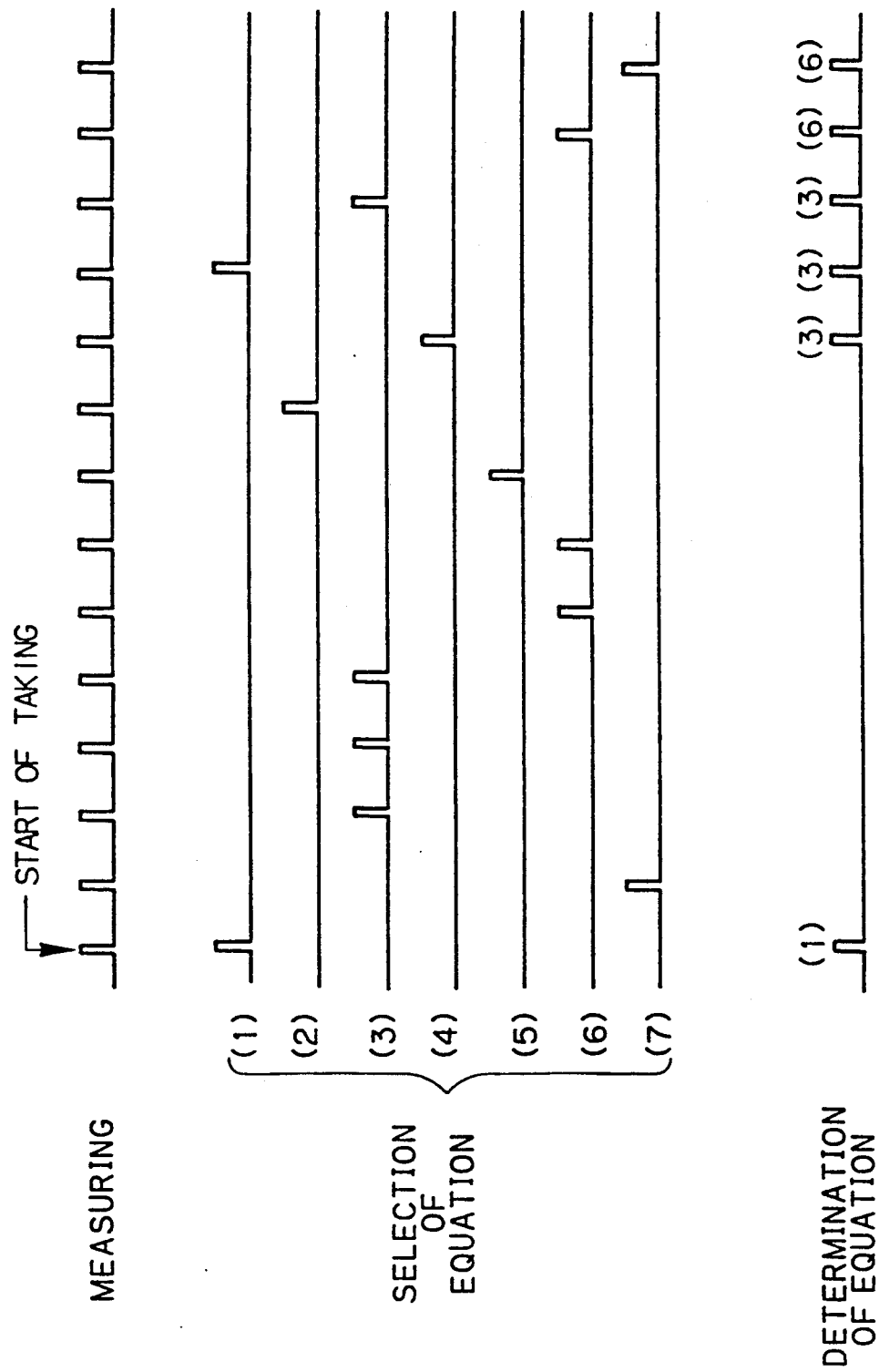
FIG. 17 is a timing chart for illustrating the operation of determining an equation by checking the frequency of selection of an equation at each measuring.

In the above embodiment, the equation is changed every predetermined period. Instead, the most frequently selected equation may be selected from a predetermined number of previously selected equations. With the selected equation being used, the change in the exposure control is not only smooth but minute changes for consecutive scenes may also be followed precisely. FIG. 17 illustrates such an embodiment. Specifically, when an equation is newly selected at a certain measuring, nine equations previously selected at preceding measurings are considered in order to select therefrom the most frequently selected one. The average brightness values obtained at the present measuring are substituted in the selected equation to calculate the multi-pattern measured brightness value. If there are two or more frequently selected equations, the frequency may be determined by further considering a predetermined number of the equations before the nine equations.

Figure 18:
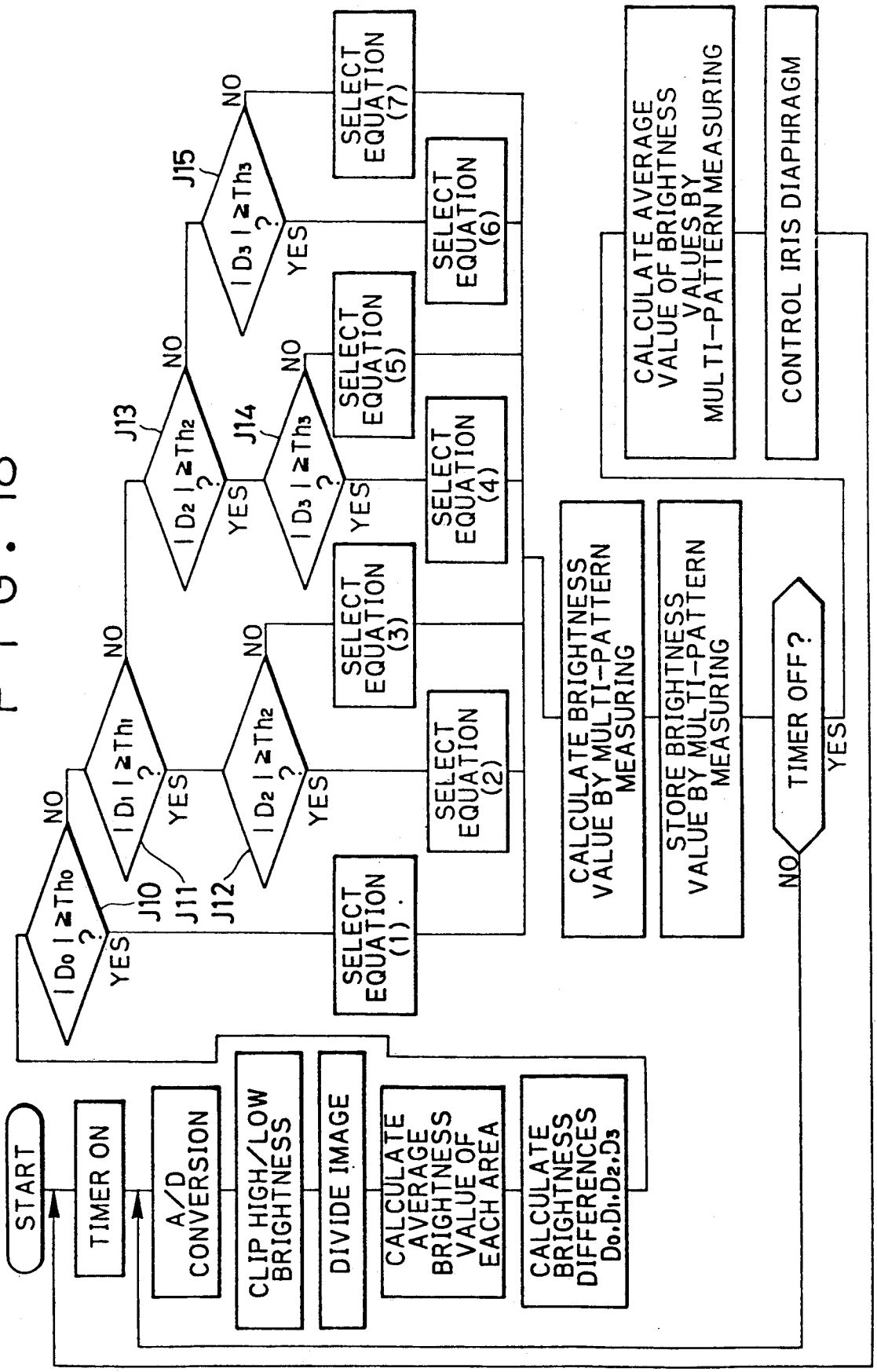
FIG. 18 is a flow chart illustrating an embodiment of the present invention wherein an average value for multi-pattern measured brightness values obtained during a predetermined time period is calculated, and the exposure control is executed in accordance with the average value.

In the above-described embodiments, the equation to be used is changed. However, the scene brightness value may be changed instead for each predetermined time period. FIG. 18 illustrates such an embodiment. A plurality of measurings are executed while the timer is turned on for a predetermined period (⅛ second), and multi-pattern measured brightness values for respective measurings are calculated and stored in the memory. After a lapse of the predetermined period, the plurality of multi-pattern measured brightness values are read from the memory and the average value is calculated. In accordance with this average value, the diaphragm aperture size is controlled, and at this diaphragm aperture size, the next measurement for obtaining such an average value is executed as well as the calculation of the scene brightness value. It is also possible to perform the exposure control by calculating an average value which takes into account a predetermined number of previous scene brightness values, as in the case of the embodiment illustrated in FIG. 17.

Figure 19:
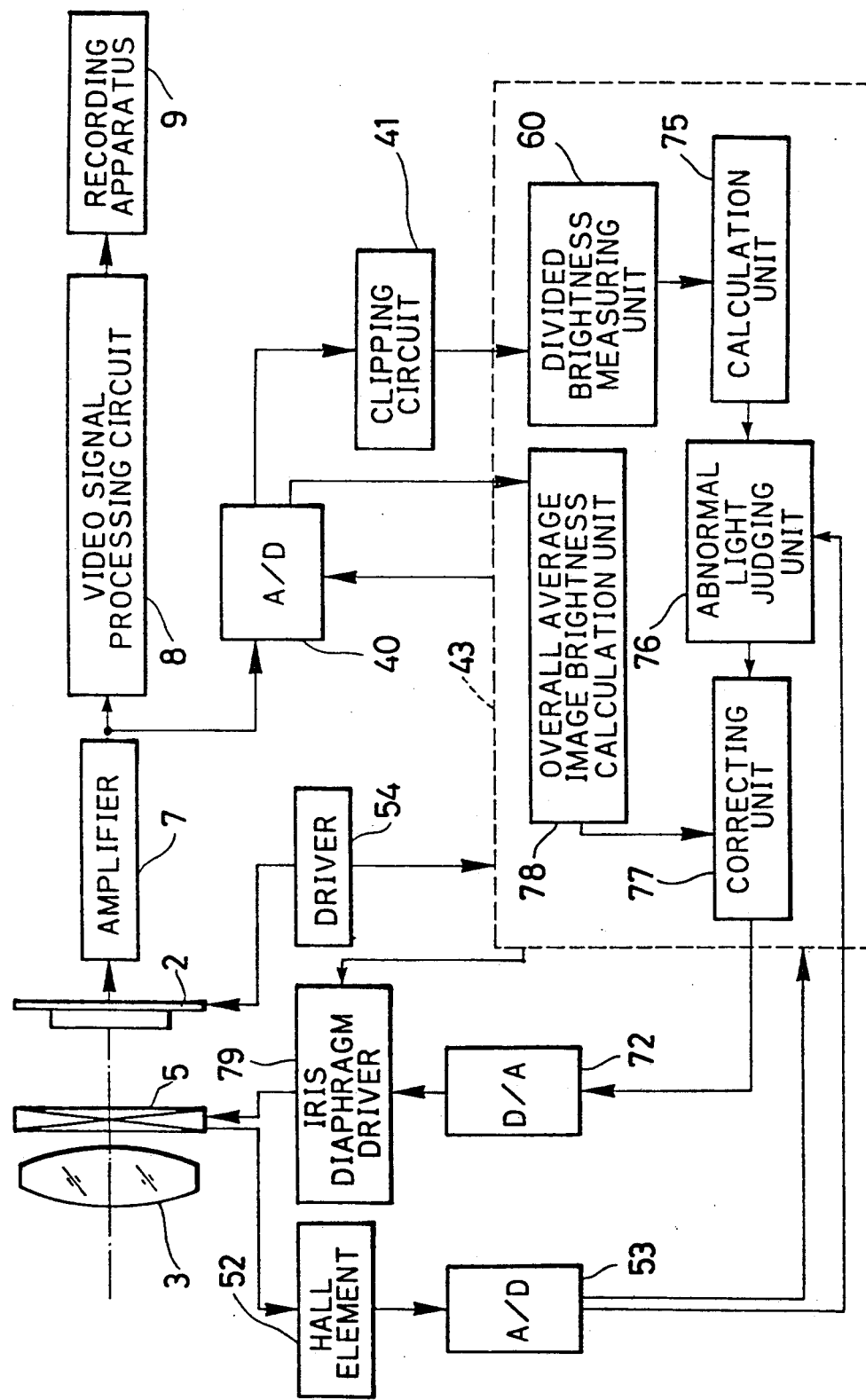
FIG. 19 is a block diagram illustrating an embodiment of the present invention wherein the multi-pattern measured brightness value is corrected by considering the overall image averaged brightness value.
Figure 20:
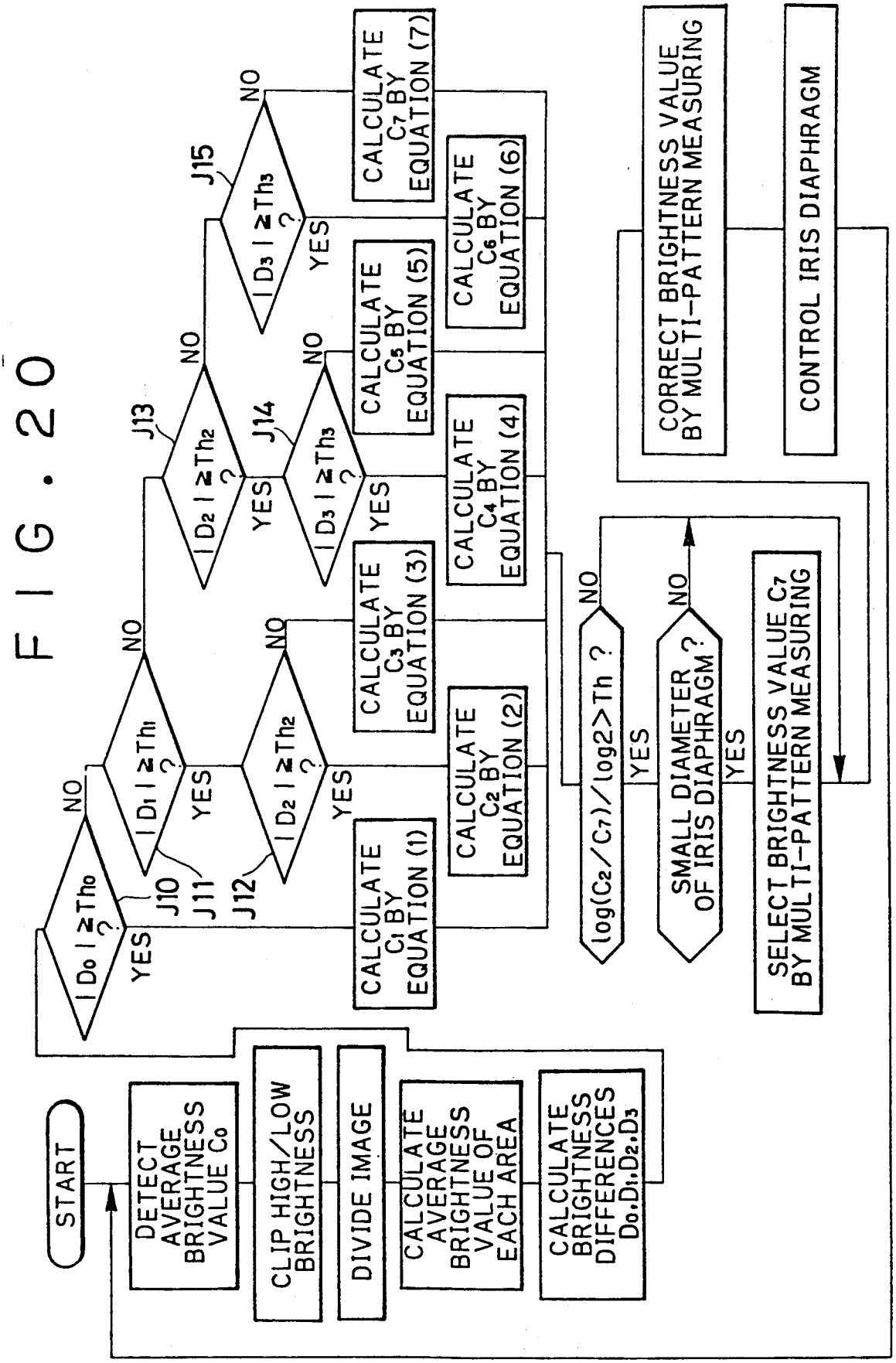
FIG. 20 is a flow chart for explaining the operation of the embodiment illustrated in FIG. 19.
Figure 21:
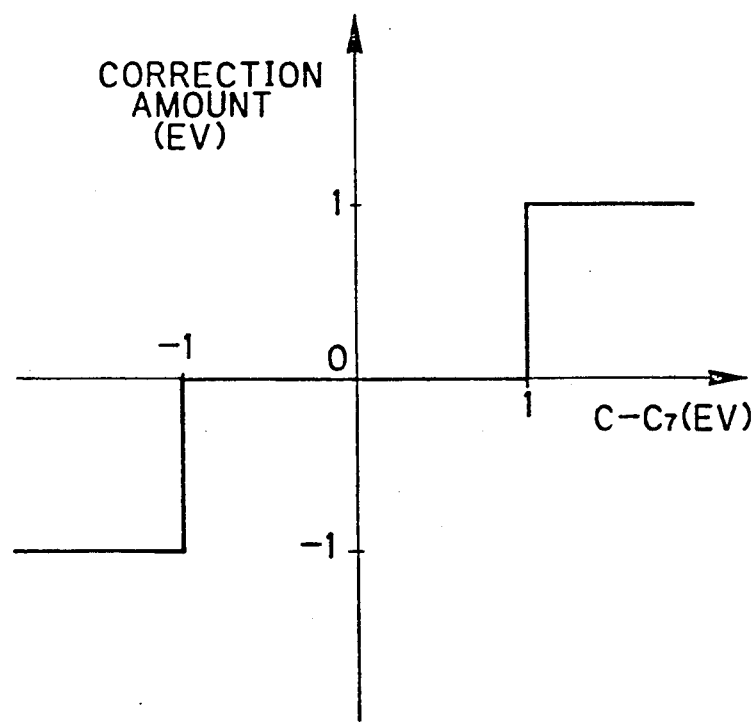
FIG. 21 is a graph illustrating the correction amount.

FIGS. 19 to 21 illustrate an embodiment wherein, if the average brightness value of the central area is equal to or higher than the average of the peripheral area by an amount of a predetermined threshold value and the diaphragm aperture size is small, then abnormal light is determined to be present at the central area of a scene and the multi-pattern measured brightness value is corrected for preventing the peripheral area from being too dark. Elements similar to the elements illustrated in FIG. 14 are represented by identical reference numerals. With this arrangement, it is possible to avoid significant exposure failure for such scenes which may otherwise be adversely affected in the two modes switching method or the multi-pattern measuring method.

The MPU 43 illustrated as functional blocks is constructed of a divided brightness measuring unit 60, a calculation unit 75, an abnormal light judging unit 76, a correcting unit 77, and an overall image averaged brightness value calculation unit 78. The divided brightness measuring unit 60 calculates the averaged brightness value of each area as described before. The calculation unit 75 discriminates a scene by using the average brightness value of each area as described before, and selects one of the equations (1) to (7) prepared for respective types of scenes for calculating the multi-pattern measured brightness value C and the multi-pattern measured brightness values $C_2$ and $C_7$ used for the detection of abnormal light.

The abnormal light judging unit 76 compares the multipattern measured brightness values $C_2$ and $C_7$ calculated by the calculation unit 75, and judges whether there is abnormal light, such as sun light, within the area $S_1$, in response to the diaphragm 5 being at a small aperture size (e.g., f-number 8 or more) at the time of photometry. If abnormal light is present, then the multi-pattern measured brightness value $C_7$ is selected and sent to the correcting unit 77. On the other hand, if abnormal light is not present, then the multipattern measured brightness value C obtained through the scene discrimination is sent to the correction unit 77. The correcting unit 77 refers to the overall image averaged brightness value $C_0$ detected by the overall image brightness value calculation unit 78, and calculates a scene brightness value $C_E$ by correcting a brightness value outputted from the abnormal light judging unit 76. The correcting unit 77, which is connected to the diaphragm driver 79 via a D/A converter 72, drives the diaphragm 5 in accordance with the scene brightness value $C_E$. The drive speed of the diaphragm 5 is controlled for preventing the exposure amount of the principal subject from changing unstably, in accordance with the change amount of the scene brightness value $C_E$ and the presence/absence of a continuity between the scenes.

The operation of the apparatus illustrated in FIG. 19 will be described next with reference to the flow chart illustrated in FIG. 20. In accordance with the program sequence in the MPU 43, the divided brightness measuring unit 60 calculates the average brightness value of each area. The calculation unit 75 discriminates a scene and calculates the multi-pattern measured brightness values C, $C_2$, and $C_7$ by using the average brightness values of respective areas.

The abnormal light judging unit 76 calculates a brightness difference log $(C_2/C_7)$;/log 2 between the multi-pattern measured brightness values $C_2$ and $C_7$. The calculation result is compared with the threshold value Th (e.g., 3 EV). If log($C_2/C_7$)/log 2>Th, then there is a large brightness difference between the average brightness value $B_1$ of the area $S_1$ and the average brightness value $B_{1234}$ of the areas $S_1$ to $S_4$ such that this difference is larger than Th. However, it cannot be definitely determined whether there is abnormal light if the overall image brightness level is low. For this reason, the aperture size of the diaphragm 5 at the time of photometry is measured with the Hall element 52, and sent via the A/D converter 53 to the abnormal light judging unit 76 for determining whether the diaphragm 5 is set at a small aperture size (e.g., f-number 8 or more). If the diaphragm 5 is set to a small aperture size, instead of the multi-pattern brightness value C obtained from the equation selected by the scene discrimination, then the multi-pattern measured brightness value $C_7$ is sent to the correcting unit 77. If log $(C_2/C_7)/\log 2 \leq Th$, then there is not a large brightness difference between the average brightness values $B_1$ and $B_{1234}$ and the multi-pattern measured brightness value C obtained through the scene discrimination is sent to the correcting unit 77.

The multi-pattern measured brightness value C supplied to the correction unit 77 is corrected by a correction amount clipping illustrated in FIG. 21, which refers to the overall image averaged brightness value $C_0$ detected by the overall image averaged brightness value calculation unit 78. Specifically, if the difference between the multi-pattern measured brightness value C and the overall image averaged brightness value $C_0$ is equal to or smaller than 1 EV, the actual multi-pattern measured brightness value C is used. On the other hand, if the difference is larger than 1 EV, the correction amount, for example ±1 EV, is added to the multi-pattern measured brightness value C. The aperture size of the diaphragm 5 is adjusted in accordance with the corrected scene brightness value $C_E$. The MPU 43 compares the multi-pattern measured brightness values of $C_7$ calculated at the previous and present photometry, determines whether the presently selected equation is the same as the previously selected equation, and sends such information to the diaphragm driver 79. If the brightness difference $C_S$ between the multi-pattern measured brightness values of $C_7$ at the previous and present photometry is equal to or larger than the predetermined threshold value $Th_S$ (e.g., 2 EV), then there is a high speed panning or an abrupt change in subject brightness. Accordingly, the diaphragm driver 79 controls the diaphragm 5 at a high speed correspondingly.

On the other hand, if the brightness difference $C_S$ is smaller than the threshold value $Th_S$, then it is determined whether the presently selected equation is different from the previously selected equation. If the equations are different, then there is only a slight change in the overall image brightness and the brightness distribution of scene changes, for example, a relatively slow panning or a slow motion of a subject has resulted. In such a case, there is an ample possibility that the eventual scene brightness value $C_E$ discontinuously changes due to a change in the equation, although the scene changes slowly (the presence of continuity between the scenes). Therefore, the diaphragm driver 79 controls the diaphragm 5 at a low speed because there is an ample possibility that the brightness of a scene would change unnaturally if the diaphragm 5 were to be made to follow the scene brightness value $C_E$ at a high speed. If the brightness difference $C_S$ is smaller than the threshold value $Th_S$ and the presently selected equation is the same as the equation selected previously, then there is no large change in the overall image brightness, and the brightness distribution of a frame does not change. In this case, even when the diaphragm 5 is controlled at a high speed, unnatural images do not occur. Therefore, the diaphragm driver 24 controls the diaphragm 5 at a high speed.

Figure 22:
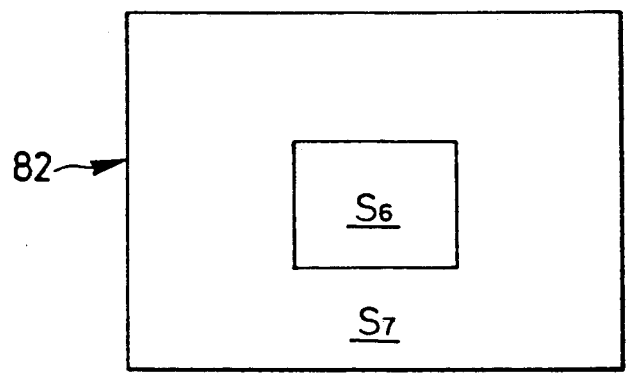
FIG. 22 illustrates the areas for divided brightness measuring.
Figure 23:
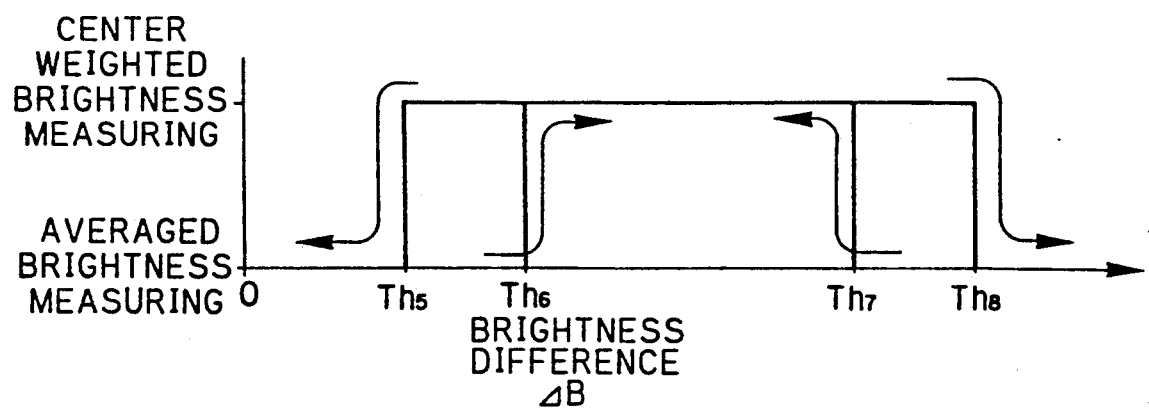
FIG. 23 is a graph illustrating the switching between measuring modes.
Figure 24:
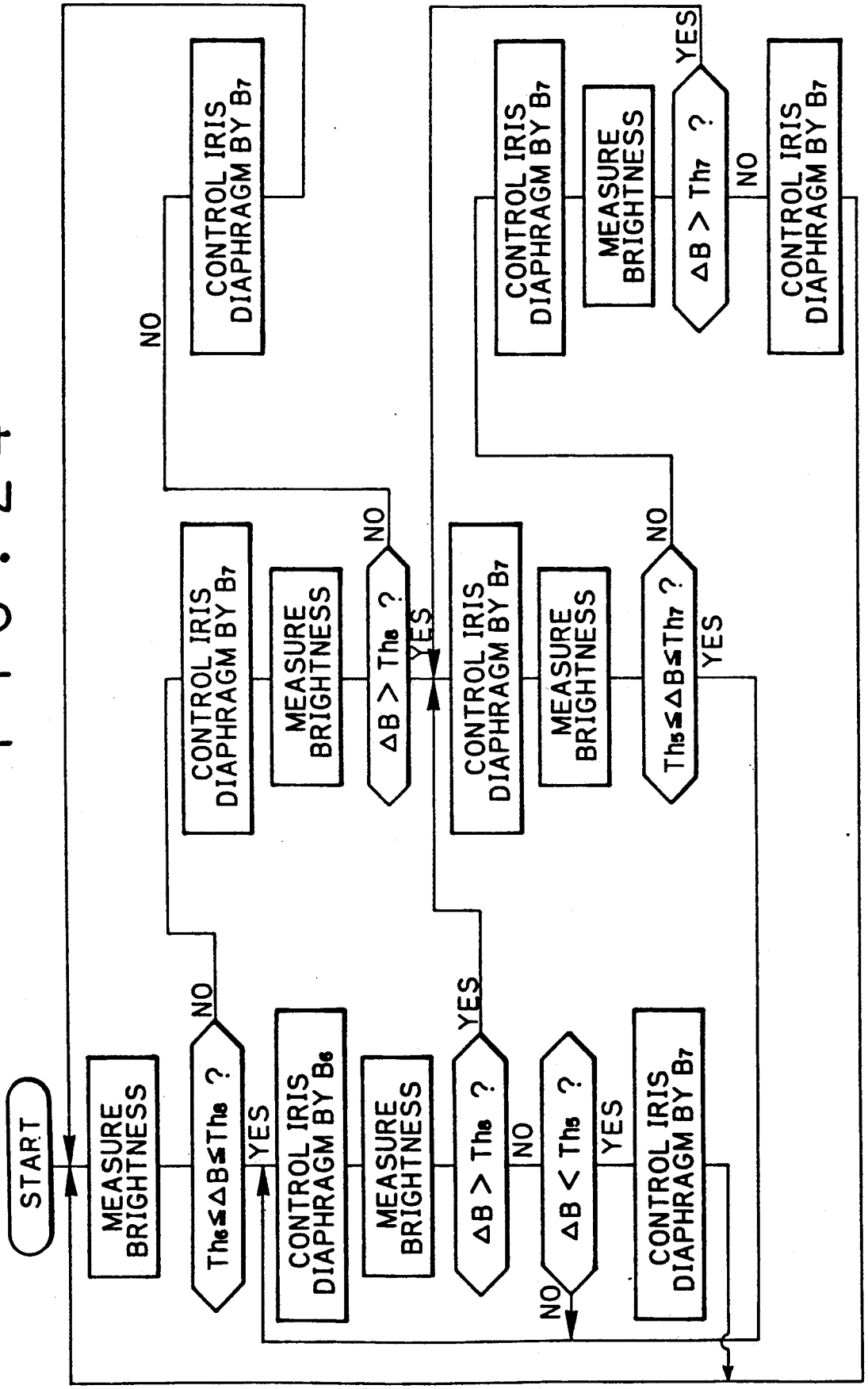
FIG. 24 is a flow chart for explaining the operation of an embodiment of the present invention wherein measuring modes are switched.

In the case where the difference between the normalized (or absolute) average brightness values at the central area and peripheral area is larger than a predetermined threshold value, the influence by abnormal light present within the central area by correcting the scene brightness value may be eliminated for preventing the peripheral area from being dark. The normalized average brightness value provides a brightness value of a subject which is made independent from the aperture size of the diaphragm. FIGS. 22 to 24 illustrate such an embodiment. As illustrated in FIG. 22, the frame 82 is divided into two areas, a central area $S_6$ and a peripheral area $S_7$. The normalized average brightness values $B_6$ and $B_7$ of the respective areas are calculated by using photometric values which take into account the aperture size information at the time of photometry. In accordance with the difference $\Delta B$ between the normalized average brightness values $B_6$ and $B_7$, there is selected either the center weighted measuring mode using the normalized average brightness value $B_6$ or the averaged measuring mode using the normalized average brightness values $B_6$ and $B_7$ (or the periphery weighted measuring mode using the normalized average brightness value $B_7$).

As illustrated in FIG. 23, a threshold value $Th_5$ represents a transition from the center weighted measuring to the averaged brightness measuring for a general scene under a normal light which includes no subject having an extraordinary high brightness. A threshold value $Th_6$ represents a transition from the averaged brightness measuring to the center weighted measuring. A threshold value $Th_7$ represents a transition from the averaged brightness measuring to the center weighted measuring in a scene having abnormal light (e.g., sun light, and vehicle head lamp light) at the central area $S_6$. A threshold value $Th_8$ represents a transition from the center weighted measuring to the averaged brightness measuring in a scene having abnormal light at the central area $S_6$. The threshold values are related by $0 < Th_5 < Th_6 < Th_7 < Th_8$, and the values may be, for example, $Th_5 = 1$ EV, $Th_6 = 2$ EV, $Th_7 = 3$ EV, and $Th_8 = 4$ EV.

The embodiment will further be described with reference to the program sequence illustrated in FIG. 24. Immediately after scenes are begun to be picked up, it is determined whether the difference $\Delta B$ is between the two threshold values $Th_6$ and $Th_8$. If $Th_6 \leq \Delta B \leq Th_8$, then the diaphragm is controlled by the center weighted measuring using the normalized average brightness value $B_6$ as illustrated in FIG. 23. If $Th_6 \leq \Delta TB \leq Th_8$ is not satisfied, the diaphragm is controlled by the averaged brightness measuring using the normalized average brightness value $B_7$. At the next photometry, it is determined whether $\Delta B > Th_8$.

If the averaged brightness measuring was carried out at the previous photometry and if $\Delta B > Th_8$ at the present photometry, then abnormal light was present at the central area $S_6$ for the previous photometry. Thereby, the exposure control was made by the averaged brightness measuring in order to avoid under-exposure of the peripheral area $S_7$ which would be caused by the center weighted measuring. Such a scene also exists at the present photometry so that the diaphragm is controlled by using the normalized average brightness value $B_7$. If the averaged brightness measuring was carried out at the previous photometry and $\Delta B > Th_8$ is not satisfied at the present photometry, then $\Delta B < Th_6$ has continued from the previous photometry. Because the brightness difference $\Delta B$ between the central area $S_6$ and peripheral area $S_7$ is small, the diaphragm is controlled in accordance with the normalized average brightness value $B_7$ in the same manner as previously described.

If the center weighted measuring was carried out at the previous photometry and the present photometry results indicate $\Delta B > Th_8$, then the scene was switched and abnormal light is present within the central area $S_6$. Accordingly, the measuring mode is switched to the averaged measuring mode and the diaphragm is controlled by using the normalized average brightness value $B_7$. If the present photometry results indicate $\Delta B > Th_8$ is not satisfied, then the scene is similar to the previous scene or the scene has changed to a scene having no brightness difference between the central area $S_6$ and the peripheral area $S_7$. Therefore, it is determined whether $\Delta B < Th_5$. If $\Delta B < Th_5$, then the scene has changed to a scene having no brightness difference between the central area $S_6$ and the peripheral area $S_7$, the measuring mode is switched to the averaged measuring mode and the diaphragm is controlled by using the normalized average brightness value $B_7$. If $\Delta B < Th_5$ is not satisfied, then the scene is similar to the previous scene and the diaphragm is also controlled by using the normalized average brightness value $B_6$.

If $\Delta B > Th_8$ at the previous photometry and the averaged brightness measuring was carried out, then the scene has abnormal light within the central area $S_6$ at the previous photometry. In this case, it is determined at the next photometry whether $Th_5 \leq \Delta B \leq Th_7$. If $Th_5 \leq \Delta B < Th_7$, then the abnormal light has disappeared and the measuring mode is switched to the center weighted measuring mode for controlling the diaphragm by using the normalized average brightness value $B_6$. If $Th_5 \geq \Delta B < Th_7$ is not satisfied, the scene is similar to the previous scene or the scene switches to a scene having no brightness difference between the central area $S_6$ and the peripheral area $S_7$. Thereby, it is determined whether $\Delta B > Th_7$.

If $\Delta B > Th_7$, then the abnormal light is still present within the central area $S_6$ as was meant at the previous photometry. Therefore, the diaphragm is controlled also by using the normalized average brightness value $B_7$. If $\Delta B > Th_7$ is not satisfied, then the scene changes to a scene having no brightness difference between the central area $S_6$ and the peripheral area $S_7$. As a result, the diaphragm is controlled by using the normalized average brightness value $B_7$, and the sequence control returns to the initial sequence at the next photometry. In this embodiment, abnormal light is detected in accordance with the difference $\Delta B$ between normalized average brightness values of the respective areas, and the measuring mode is switched correspondingly. Accordingly, this embodiment can compensate not only for abnormal light, such as sun light under a clear sky outdoors, but also abnormal light, such as artificial illumination at night outdoors or indoors, may be compensated.

With a conventional multi-pattern measuring method, the measuring mode would in many cases automatically be switched to the center weighted measuring if the central area is considerably more dark when compared with the peripheral area. A principal subject could be picked up with a proper brightness by the center weighted measuring if the principal subject is located within the central area of a scene. However, if a principal subject is located at the peripheral area, then the principal subject would be over-exposed so that the reproduced image would have a very high brightness. It is possible in the embodiment illustrated in FIGS. 25 to 27 to pick up a balanced, and natural image of a scene of the type where the multi-pattern measuring would be used reverse-effectively, for preventing too high or too low brightness at a portion of the background.

Figure 27:
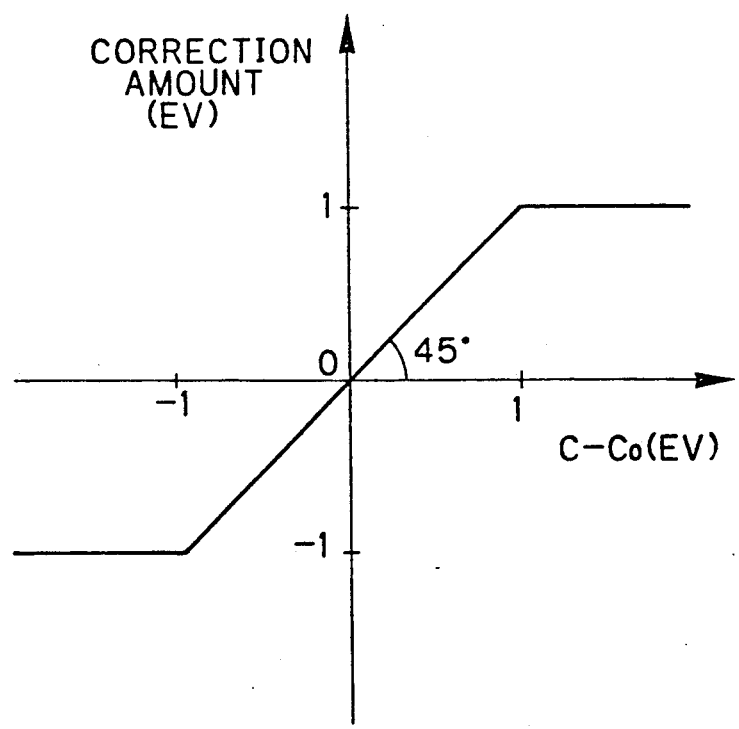
FIG. 27 is a graph illustrating the correction amount.

The MPU 43 illustrated as functional blocks is constructed of a divided brightness measuring unit 60, an equation selecting unit 68, an overall image averaged brightness calculating unit 78, a brightness value calculating unit 84 through multi-pattern measuring, and a correcting unit 85. The correcting unit 85 compares the overall image averaged brightness $C_0$ calculated by the overall image averaged brightness calculating unit 78 with the multi-pattern measured brightness value C outputted from the multi-pattern measured brightness value calculating unit 84. If the difference therebetween is a predetermined threshold value, e.g., 1 EV, then the overall image averaged brightness value $C_0$ is connected by using a correction amount clipping illustrated in FIG. 27. As illustrated in FIG. 27, if the difference between the overall image averaged brightness value $C_0$ and the multi-pattern measured brightness value C is within $\pm 1$ EV as the correction amount for correcting the overall image averaged brightness value $C_0$, then the difference between the overall image averaged brightness value $C_0$ and the multi-pattern measured brightness value C is used. On the other hand, if the difference between the overall image averaged brightness value $C_0$ and the multi-pattern measured brightness value C is in excess of $\pm 1$ EV, then the correction amount for correcting the overall image averaged brightness value $C_0$ is clipped at $\pm 1$ EV.

Figure 25:
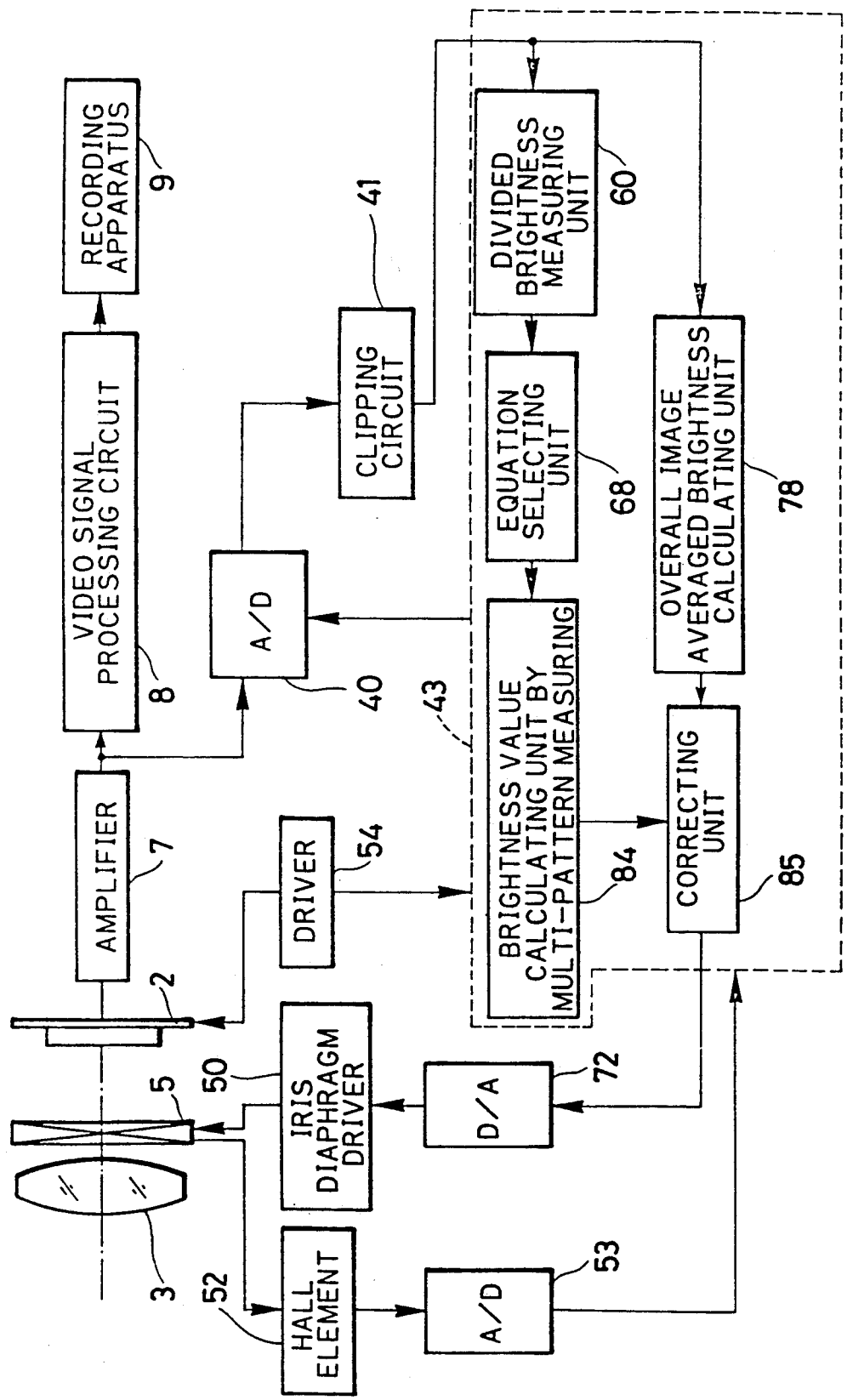
FIG. 25 is a block diagram illustrating an embodiment of the present invention wherein the overall image averaged brightness value is corrected in accordance with a multi-pattern measured brightness value.
Figure 26:
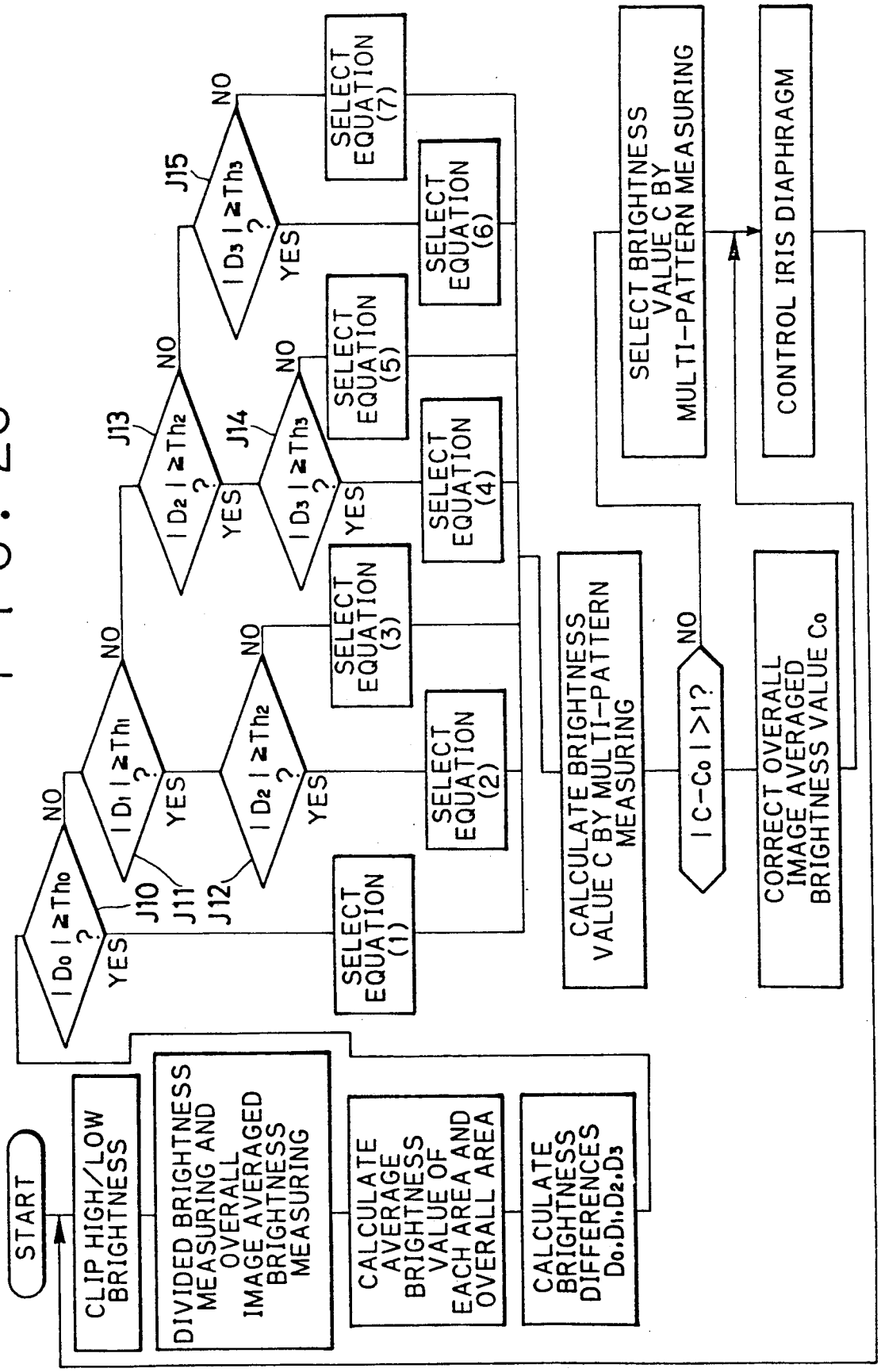
FIG. 26 is a flow chart for explaining the operation of the embodiment illustrated in FIG. 25.

The operation of the embodiment illustrated in FIG. 25 will be described with reference to FIG. 26. In the same manner as described in the previous embodiment, the multi-pattern measured brightness value C is calculated. The correcting unit 85 calculates the absolute value $|C - C_0|$ of the difference between the overall image averaged brightness value $C_0$ and the multi-pattern measured brightness value C, and compares the absolute value with the threshold value (e.g., 1 EV). If $|C - C_0| \leq 1$, then there is little difference between the overall image averaged brightness value $C_0$ and the multi-pattern measured brightness value C and an ordinary scene pick-up, such as a scene pick-up under a clear sky in a front light is assumed.

As illustrated in FIG. 27, the brightness difference between the overall image averaged brightness value $C_0$ and the multi-pattern measured brightness value C is added as the correction value to the overall image averaged brightness value $C_0$. The corrected overall image averaged brightness value is the same as the multi-pattern measured brightness value C. Consequently, the actual multi-pattern measured brightness value C is ultimately selected. On the other hand, if $|C - C_0| > 1$, then there is a large difference between the overall image averaged brightness value $C_0$ and the multi-pattern measured brightness value C. Therefore, it can be assumed, for example, the central area of a scene is in particularly high or low brightness and the principal subject is not located within the central area. In such a case, if the exposure control is carried out by using the multi-pattern measured brightness value C, then the reproduced image of the principal subject may be painted black or white. As a result, the exposure control is executed mainly by using the overall image averaged brightness value $C_0$, and executed supplementarily by using the multi-pattern measured brightness value C. The correction amount for correcting the overall image averaged brightness value $C_0$ is clipped at $\pm 1$ EV. The clipped correction amount is used for correcting the overall image averaged brightness value $C_0$.

The exposure control is executed in accordance with the scene brightness value $C_E$ outputted from the correcting unit 85. In this case, it apparently does not necessarily follow that the video output takes a standard IRE. In this embodiment, the overall image averaged brightness value $C_0$ is used as an object for comparison with the multi-pattern measured brightness value C. The averaged brightness measuring value $B_{1234}$, for example, with the exception of the area $S_5$, the center weighted measuring value and similar values may also be used. The correction amount clipping is not limited only to the clipping illustrated FIG. 27. For example, if $|C-C_0| \leq 1$, then the correction amount for correcting the overall image averaged brightness value $C_0$ may be set different from the difference between the overall image averaged brightness value $C_0$ and the multi-pattern measured brightness value C.

Figure 28:
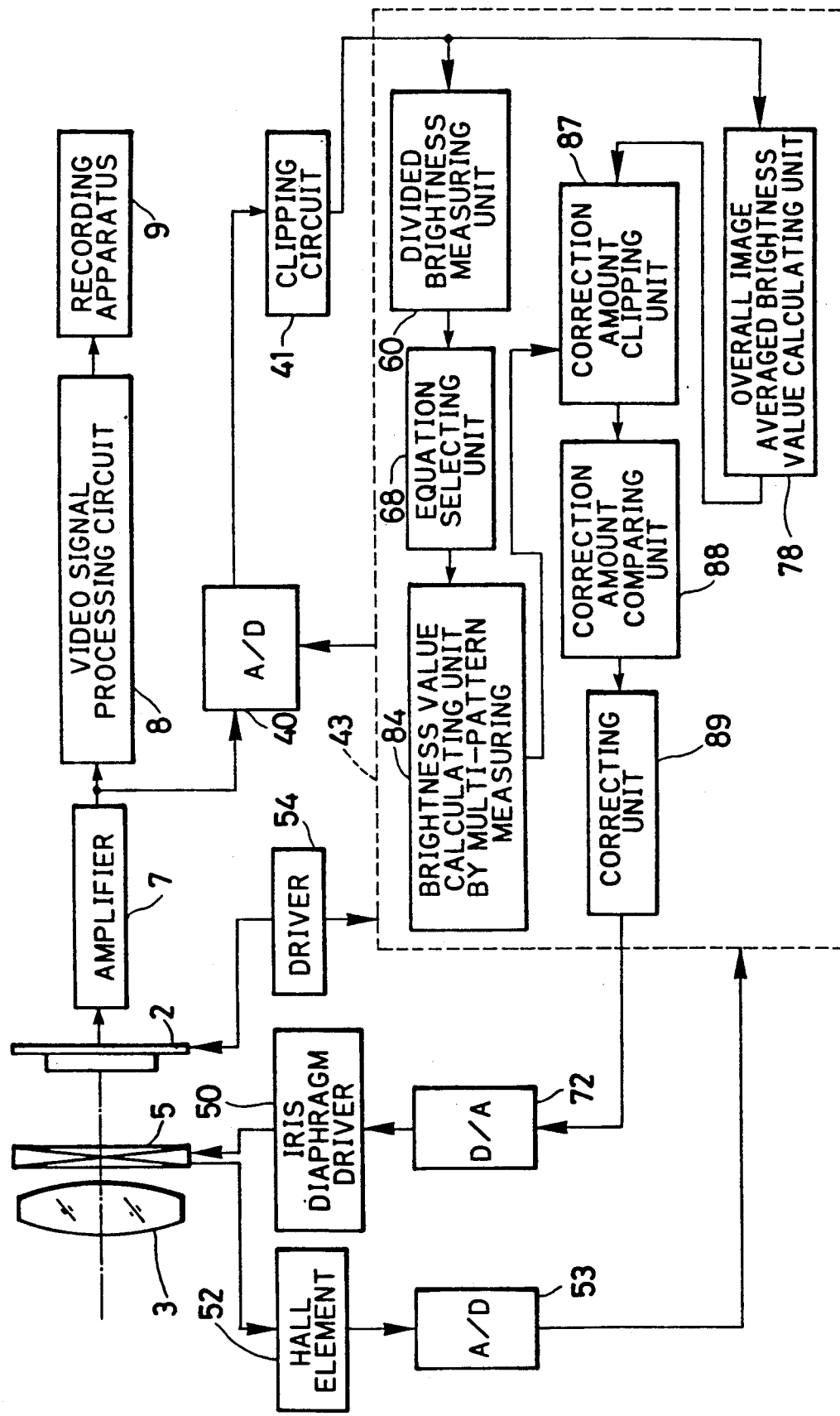
FIG. 28 is a block diagram illustrating an embodiment of the present invention wherein the present correction amount is changed by considering the previous correction amount.
Figure 29:
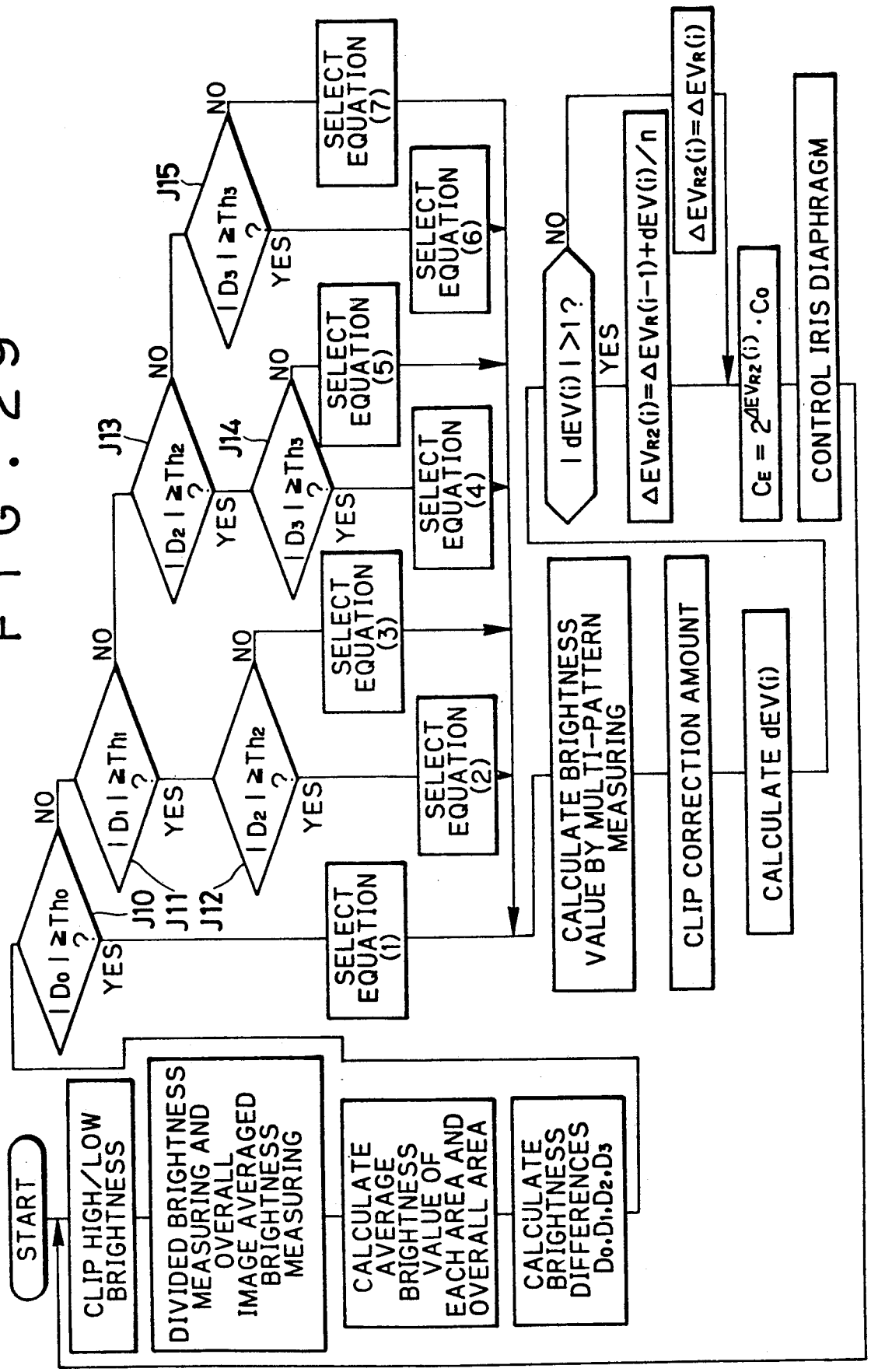
FIG. 29 is a flow chart for explaining the operation of the embodiment illustrated in FIG. 28.
Figure 30:
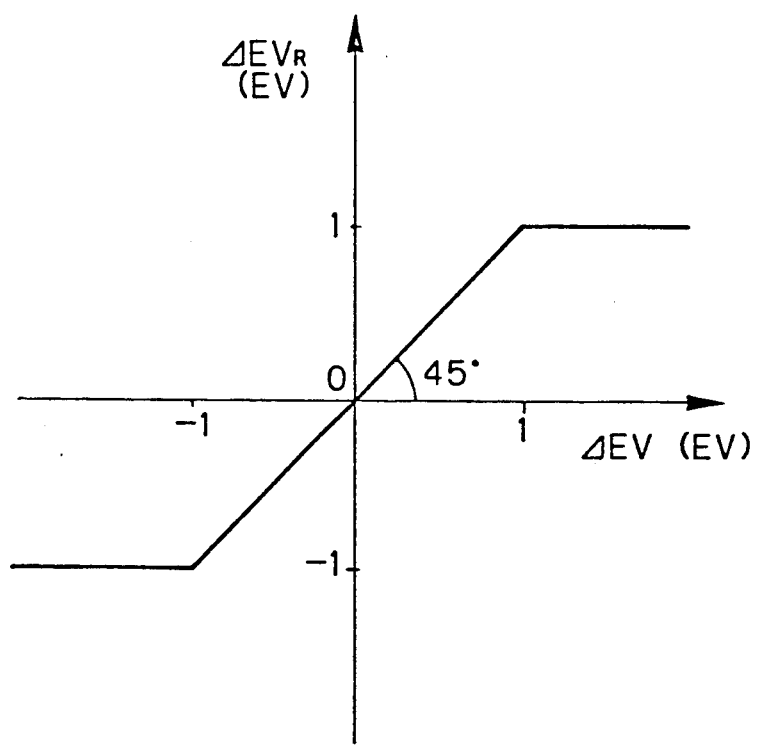
FIG. 30 is a graph illustrating the clipping of the correction amount illustrated in FIG. 28.

For continuous scenes, a smooth exposure control with a stepwise increased or decreased exposure correction amount will result in a more natural image even if the brightness distribution of a scene changes so long as the overall image averaged brightness value or an averaged brightness value with the exception of the area $S_5$ changes extraordinarily. FIGS. 28 to 30 illustrate such an embodiment. The MPU 43 is constructed of a divided brightness measuring unit 60, an overall image averaged brightness value calculating unit 78, an equation selecting unit 78, a multi-pattern measured brightness value calculating unit 84, a correction amount clipping unit 87, a correction amount comparing unit 88, and a correcting unit 89. The correction amount clipping unit 87 compares the overall image averaged brightness value $C_0$ calculated by the overall image averaged value calculating unit 78 with the multi-pattern measured brightness value C outputted from the multi-pattern measured brightness value calculating unit 84, and calculates the correction amount $\Delta EV$ for the overall image averaged brightness value $C_0$ in association with the multi-pattern measured brightness value C by the following equation. This correction amount $\Delta EV$ is calculated at a predetermined time interval (e.g., every 1/30 second).

$$\Delta EV = \log |C/C_0| / \log 2$$

The obtained correction amount $\Delta EV$ is compared with a threshold value (e.g., 1 EV), and corrected to another correction value $\Delta EV_R$ by using the correction amount clipping illustrated in FIG. 30. Namely, if $|\Delta EV| \leq 1$, then the correction amount $\Delta EV_R = \Delta EV$. If $|\Delta EV| > 1$, then $|\Delta EV_R| = 1$. $\Delta EV_R$ is thereafter sent to the correction amount comparing circuit 22.

As illustrated in FIG. 31, the correction amount obtained at the i-th time from the start of controlling the diaphragm is represented by $\Delta EV_R(i)$. The correction amount comparing unit 88 compares $\Delta EV_R(i)$ with the previous $\Delta EV_R(i-1)$ to calculate the difference $dEV(i)$ therebetween. $|dEV(i)|$ is compared with the threshold value (e.g., 1 EV) to correct $\Delta EV_R(i)$ obtained from the correction amount clipping unit 87 and calculate the final correction amount $\Delta EV_{R2}(i)$. Such correction is carried out for example in the following manner, where n is an integer, e.g., from 5 to 10.

If $|dEV(i)| < 1$, then $$\Delta EV_{R2}(i) = \Delta EV_R(i).$$

If $|dEV(i)| \geq 1$, then $$\Delta EV_{R2}(i) = \Delta EV_R(i-1) + dEV(i)/n.$$

The correcting unit 89 corrects the overall image averaged brightness value $C_0$ by the final correction amount $\Delta EV_{R2}(i)$ to calculate the scene brightness value $C_E$. The diaphragm 5 is controlled in accordance with this scene brightness value $C_E$ which is given, for example, by the following equation:

$$C_E = C_0 \times 2^{\Delta EV'_{R2}(i)}.$$

The overall image averaged brightness value $C_0$ may be replaced with the averaged brightness measured value for a portion of a frame, or may be a brightness value obtained by the center weighted measuring.

Figure 32:
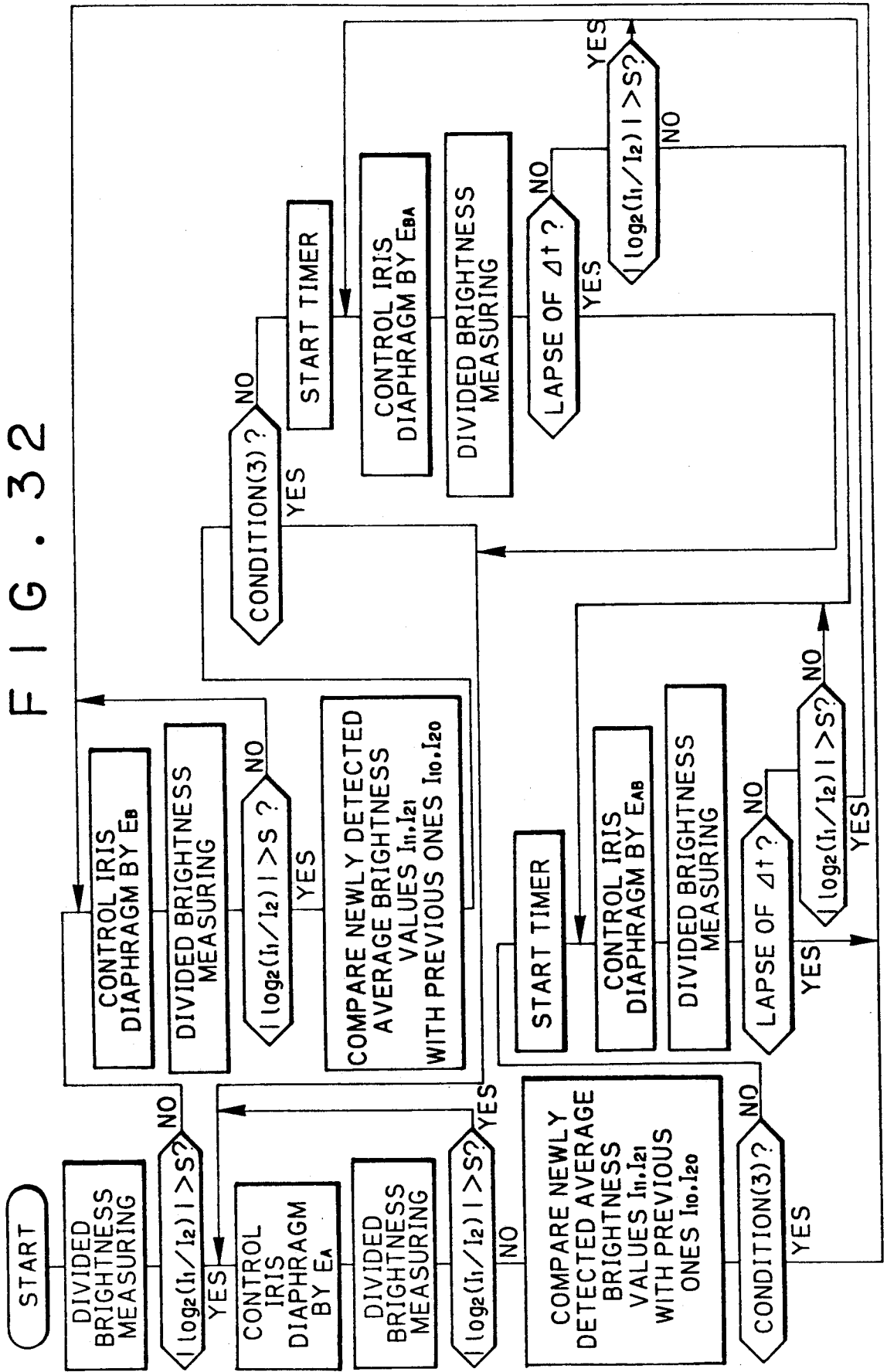
FIG. 32 is a flow chart illustrating a correction amount which is used in an embodiment of the present invention wherein the weighting value is gradually changed.
Figure 33:
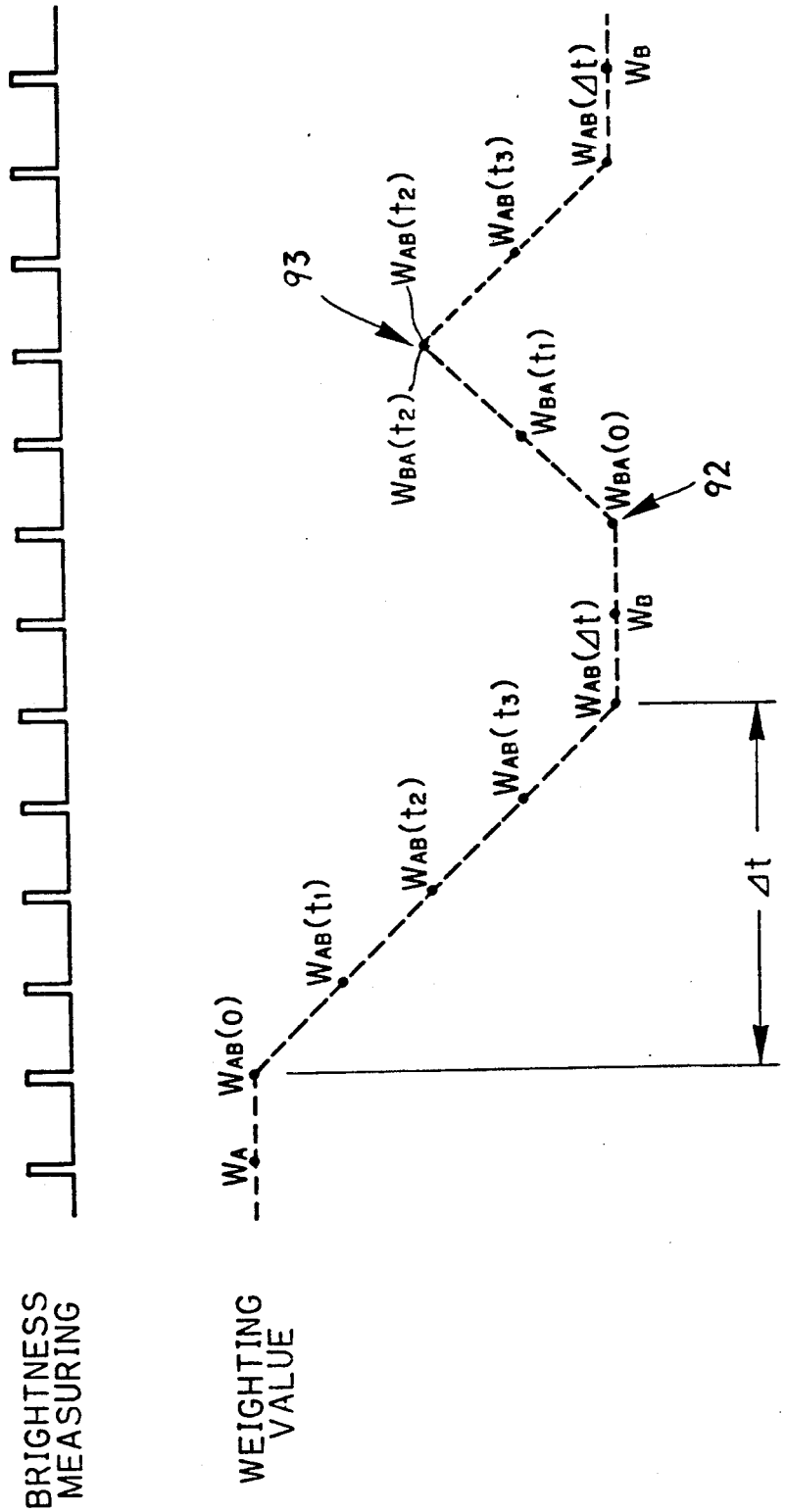
FIG. 33 is a timing chart illustrating a change in the weighting value.

FIGS. 32 to 33 illustrate an embodiment wherein if the presently selected equation is different from the previously selected equation, then the previous weighting value is stepwise changed to obtain the scene brightness value. The frame 23 undergoes the divided brightness measuring to obtain the averaged brightness values $B_1$ to $B_4$ for the areas $S_1$ to $S_4$ as illustrated in FIG. 11. Using these averaged brightness values, the average brightness value $B_{234}$ of the areas $S_2$ to $S_4$ is obtained. For simplifying the notation of symbols, $B_1$ is represented by $I_1$, and $B_{234}$ is represented by $I_2$. If $|\log_2(I_1/I_2)| > S$ (S is a threshold value, e.g., 2 EV), then the principal subject is assumed to be located within the central area. Accordingly, an equation (10) is selected to calculate the center weighted averaged brightness value $E_A$ to control the diaphragm 5. If $|\log_2(I_1/I_2)| > S$ is not satisfied, then there is only a small brightness difference between the central area and peripheral area. Accordingly, an equation (11) is selected to calculate the overall image averaged brightness value $E_B$ to control the diaphragm 5. The equations (10) and (11) are as follows, where $W_{An}$ and $W_{Bn}$ are weighting values.

$$E_A \sum_{n=1}^{5} W_{An} \times B_n / \sum_{n=1}^{5} W_{An}. \quad \text{Equation (10)}$$

$$E_B \sum_{n=1}^{5} W_{Bn} \times B_n / \sum_{n=1}^{5} W_{Bn}. \quad \text{Equation (11)}$$

A scene discrimination is executed next to obtain a scene brightness value for controlling the diaphragm 5. Letting $I_{11}$ and $I_{21}$ be the presently obtained averaged brightness values $I_1$ and $I_2$, and $I_{10}$ and $I_{20}$ be the previous averaged brightness values $I_1$ and $I_2$, the scene discrimination is carried out through the comparisons between these brightness values. TABLE 4, which is used for scene discrimination, is illustrated below, where $P_1$ and $P_2$ are given by the following equations. The threshold values $Th_1$ and $Th_2$ are, for example, 0.5 EV and 1 EV, respectively.

TABLE 4

$$P_1 = |\log_2(I_{11}/I_{10})|$$

$$P_2 = |\log_2(I_{21}/I_{20})|$$

| CONDITION (1) | CONDITION (2) | CONDITION (3) | CONDITION (4) |
|---|---|---|---|
| $P_1 \leq Th_1$ | $P_1 > Th_1$ | $P_1 > Th_1$ | $P_1 \leq Th_1$ |
| $P_2 > Th_2$ | $P_2 \leq Th_2$ | $P_2 > Th_2$ | $P_2 \leq Th_2$ |
| Change in Background | Motion of Main Subject | Scene Switched | No change |

The condition (1) or (2) corresponds to the case where the measuring mode is switched without any scene change and the brightness of the central area or peripheral area changes The condition (1) corresponds to, for example, a slow panning, and the condition (2) corresponds to picking up scenes on a stage with a video camera that is fixed. In such a case, in order not to quickly change the scene brightness value calculated upon switching of the equation, weighting of the equation is stepwise changed For example, the equation is arranged to be changed in the period of a plurality of frames, e.g., a time $\Delta t$ corresponding to four frames, as illustrated in FIG. 33. For example, in switching from the equation (10) to (11), the scene brightness value $E_{AB}(t)$ during the switching is calculated by the following correction equation (12), where $t=0$ is the time when the switching starts.

$$E_{AB}(t) = \sum_{n=1}^{5} [W_{An} + (W_{Bn} - W_{An})/\Delta t \times t] \times \text{Correction Equation (12)}$$

$$B_n / \sum_{n=1}^{5} [W_{An} + (W_{Bn} - W_{An})/\Delta t \times t].$$

In switching from the equation (11) to (10), the scene brightness value $E_{BA}(t)$ is calculated by the following correction equation (13).

$$E_{BA}(t) = \sum_{n=1}^{5} [W_{Bn} + (W_{An} - W_{Bn})/\Delta t \times t] \times \text{Correction Equation (13)}$$

$$B_n / \sum_{n=1}^{5} [W_{Bn} + (W_{An} - W_{Bn})/\Delta t \times t].$$

The description is next directed to the case where the equation (10) was selected at the previous divided brightness measuring. First, the averaged brightness values $I_1$ and $I_2$ obtained at the present photometry are compared with each other. If $|\log_2(I_1/I_2)| > S$, then the measuring mode is the same and the equation (10) is selected for calculating the center weighted averaged brightness value $E_A$ and controlling the diaphragm 5. If $|\log_2(I_1/I_2)| \leq S$, then the measuring mode has changed and a scene discrimination is executed.

The MPU 43 determines whether the condition (3) in TABLE 4 is satisfied ($P_I > Th_1$ and $P_2 > Th_2$). If the condition (3) is satisfied, then the scene has been switched and the equation (11) is selected for calculating the overall image averaged brightness value $E_B$ and controlling the diaphragm 5. If the condition (3) is not satisfied although the measuring mode has changed, then the scene remains similar. Accordingly, it is assumed that the condition (1) or (2) may be satisfied.

The MPU 43 causes the internal timer to start. In order to make smooth the change in brightness value calculated upon switching of the equation, the brightness value $E_{AB}(t)$ is calculated by the correction equation (12) and the diaphragm 5 is controlled continuously and smoothly. Namely, after the timer starts at $t=0$, $E_{AB}(0)$ is immediately calculated. $E_{AB}(t_1)$ is next calculated in accordance with the average brightness values $B_1$ to $B_5$ obtained through the divided brightness measuring by the brightness signals of one frame newly read. In this manner, the measuring and calculation are repeated before a lapse of time $\Delta t$ to sequentially calculate brightness values $E_{AB}(t)$ and control the diaphragm 5.

The weighting values used for the correction equation (12) are given by:

$$\sum_{n=1}^{5} [(W_{An} + (W_{Bn} - W_{An})/\Delta t \times t].$$

With this weighting value being represented by $W_{AB}(t)$, the weighting value $W_{AB}(t)$ changes from $W_{AB}(0)$ to $W_{AB}(t_1)$, $W_{AB}(t_2)$, $W_{AB}(t_3)$, and $W_{AB}(\Delta t)$ in this order during the time $\Delta t$, in which $W_{AB}(0) = W_A$, and $W_{AB}(\Delta t) = W_B$.

Similarly, the weighting value for the correction equation (13) is given by:

$$\sum_{n=1}^{5} [W_{Bn} + (W_{An} - W_{Bn})/\Delta t \times t].$$

With this weighting value being represented by $W_{BA}(t)$, the weighting value $W_{BA}(t)$ changes from $W_{BA}(0)$ to $W_{BA}(t_1)$, $W_{BA}(t_2)$, $W_{BA}(t_3)$, and $W_{BA}(\Delta t)$, in this order during the time $\Delta t$, where $W_{BA}(0) = W_B$, and $W_{BA}(\Delta t) = W_A$.

A change in the measuring mode during the time $\Delta t$ is checked at each new photometry. If the measuring mode is changed before the lapse of the time $\Delta t$, then the correction equation (12) is changed to the correction equation (13) at that time.

The foregoing description is directed to the case where the equation (10) is selected initially. The exposure control for the case where the equation (11) is selected first can be executed by substantially the same sequence. Therefore, a description for this exposure control is omitted.

An example of a change in the measuring mode during the time $\Delta t$, is the case where a principal subject under spot light illumination on a stage is located at one end of the frame (the weighting value is $W_B$), moves to the center of the scene, passes quickly and reaches the opposite end before the lapse of the time $\Delta t$.

This case will be more clearly described with reference to the timing chart illustrated in FIG. 33. At a point 92, the principal subject starts moving toward the central area from one end of the frame so that the MPU 43 selects the correction equation (13) for calculating the scene brightness value $E_{BA}(0)$ having a weighting value $W_{BA}(0)$ and controlling the diaphragm 5. At a point 93 after a lapse of the time $t_2$, the principal subject passes the central area and moves toward the other end of the frame so that the MPU 43 selects the correction equation (12) for calculating the scene brightness value $E_{AB}(t_2)$ having a weighting value $W_{AB}(t_2)$ and controlling the diaphragm 5. As the time further lapses, the scene brightness values $E_{AB}(t_3)$ and $E_{AB}(\Delta t)$ ($=E_B$) are sequentially calculated to control the diaphragm 5 in accordance with the obtained scene brightness values. It is noted that the measuring mode is not limited only to the center weighted measuring mode, and the averaged measuring mode. Thereby, a larger number of other measuring modes may be used.

In the above described embodiments, the exposure control is executed by using the diaphragm. Instead, the charge accumulation time of an image sensor may be changed for exposure control. The invention is also applicable to a continuous pick-up mode of a still video camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

We claim:

1. An exposure control apparatus comprising:
an image sensor for picking up a scene and generating video signals;
adjusting means for adjusting an exposure amount of said image sensor;
evaluating means for evaluating a time sequential change of said video signals corresponding to at least two different areas in a pick-up frame of said image sensor; and
speed changing means for changing a control speed of said adjusting means in response to a signal generated from said evaluating means depending on whether or not a change in the scene has occurred.

2. An exposure control apparatus according to claim 1, wherein said adjusting means comprises an iris diaphragm disposed in front of said image sensor.

3. An exposure control apparatus according to claim 2, wherein said speed changing means selectively switches said control speed between a first speed and a second speed greater than said first speed.

4. An exposure control apparatus according to claim 1, wherein said two different areas comprise substantially an overall image area and a central image area.

5. An exposure control apparatus according to claim 4, wherein said evaluating means determines a scene change by evaluating a first brightness change of one of said two different areas and a second brightness change of the other of said two different areas.

6. An exposure control apparatus according to claim 4, wherein said evaluating means determines a scene change by evaluating a difference between a first brightness change of one of said two different areas and a second brightness change of the other of said two different areas.

7. An exposure control apparatus for a video camera comprising:
an image sensor for picking up a scene and generating a video signal;
adjusting means for adjusting an exposure amount of said image sensor;
an acceleration sensor for measuring an acceleration applied to said video camera; and
speed changing means for changing a control speed of said adjusting means in response to a signal generated from said acceleration sensor.

8. An exposure control apparatus for a video camera according to claim 7, wherein said acceleration sensor detects said acceleration in a first direction and a second direction orthogonal to said first direction.

9. An exposure control method for a video camera which picks up a scene with an image sensor by converting an optical image into video signals, comprising the steps of:
measuring average brightness photometric values respectively of a plurality of areas in accordance with said video signals corresponding to each of said areas by dividing a pick-up frame of said image sensor into said plurality of areas;
selecting one of a plurality of equations, each of said plurality of equations having a different weighting for comparing said average brightness photometric values of said respective areas;
calculating a scene brightness photometric value from said selected equation for each said scene; and
changing an exposure control speed depending on whether a change amount of said scene has occurred, the change amount of said scene being detected based on a change in said average brightness photometric values from said step of measuring by dividing said pick-up frame or a change in said selected equation at said step of selecting one of said plurality of equations.

10. An exposure control method for a video camera which picks up a scene with an image sensor by converting an optical image into video signals, comprising the steps of:
periodically measuring average brightness values respectively of a plurality of areas in accordance with said video signals corresponding to each of said areas by dividing a pick-up frame of said image sensor into said plurality of areas;
selecting one of a plurality of equations, each of said plurality of equations having a different weighting for comparing said average brightness values of said respective areas;
determining a most frequently selected equation of said plurality of equations selected during a predetermined period;
calculating a scene brightness value for each measurement from said determined equation which is used until a new determination is made after said predetermined period; and
adjusting an exposure amount of said image sensor corresponding to said scene brightness value which depends upon the most frequently selected equation during said predetermined period.

11. An exposure control method for a video camera which picks up a scene with an image sensor by converting an optical image into video signals, comprising the steps of:
periodically measuring average brightness values respectively of a plurality of areas in accordance with said video signals corresponding to each of said areas by dividing a pick-up frame of said image sensor into said plurality of areas;
calculating a scene brightness value at each measurement by selecting one of a plurality of equations, each of said plurality of equations having a different weighting for comparing said average brightness values of said respective areas;
obtaining an average value of said scene brightness value selected during a predetermined period; and
adjusting an exposure amount of said image sensor in response to said average value obtained during said predetermined.

12. An exposure control method for a video camera having a pick-up frame that is divided into a plurality of areas to obtain average brightness values of each of said plurality of areas, comprising the steps of:
comparing the average brightness values of each of said plurality of areas with each other to select one of a plurality of equations, each of said plurality of equations having a different weighting value;
calculating a multi-pattern measured brightness value in accordance with the selected equation;
developing a first average brightness value from a specific partial area or an overall area of said pick-up frame simultaneously with calculating said multi-pattern measured brightness value;

determining whether a difference between said first average brightness value and said multi-pattern measured brightness value is greater than or equal to a predetermined threshold value; and executing an exposure control corresponding to a corrected average brightness value in response to correcting said average brightness value by an amount less than a predetermined value when said difference is greater than or equal to said predetermined threshold value.

13. An exposure control method for a video camera comprising the steps of:

developing a first average brightness value from substantially an overall area or a specific partial area of a pick-up frame, said pick-up frame being divided into a plurality of areas;

executing an exposure control in accordance with said first average brightness value;

comparing said first average brightness value for each of a plurality of areas with each other;

correcting said first average brightness value by a first correction amount less than a predetermined value when the difference between said first average brightness value and said multi-pattern measured brightness value is greater than or equal to a predetermined threshold value;

executing said exposure control in response to said corrected first average brightness value;

developing a second correction amount for a continuous scene pickup;

correcting said first correction amount corresponding to a difference between said second correction amount and said first correction amount when said difference is greater than or equal to said predetermined threshold value; and correcting said first average brightness value in response to said step of correcting said first correction amount.

14. An exposure control method for a video camera comprising the steps of:

developing average brightness values from a plurality of areas of a pick-up frame;

comparing said average brightness values with each other;

selecting one of a plurality of equations in response to said step of comparing, each of said plurality of equations having a different weighting value corresponding to said average brightness values for each of said plurality of areas;

calculating a scene brightness value for an exposure control speed from said selected equation, said scene brightness value being calculated from a first weighting value for a first selected equation which gradually approaches a second weighting value from a second selected equation of a continuous scene pick-up when said second selected equation is different from said first selected equation; and determining whether a change of scene has occurred for changing said selected equation at a low speed when the change of scene has failed to occur and it is necessary to change said selected equation and changing said selected equation rapidly when the change of scene has occurred.

15. An exposure control apparatus comprising:

an image sensor for picking up a scene and generating a video signal;

adjusting means for adjusting an exposure amount of said image sensor;

detecting means for detecting a change of said scene; and stepwise changing means, responsive to said change of said scene, for stepwise changing an exposure control speed depending on whether or not the change of the scene has occurred for stably executing an exposure control.

* * * * *